(12) United States Patent
Vaughan et al.

(10) Patent No.: US 12,559,148 B2
(45) Date of Patent: Feb. 24, 2026

(54) METHODS AND SYSTEMS FOR AGGREGATING AND LEVERAGING LOCATION-BASED DATA GENERATED BY TRAIN RECORDER DEVICES

(71) Applicant: Intramotev Inc., St. Louis, MO (US)

(72) Inventors: Kenneth Huntington Vaughan, St. Louis, MO (US); Timothy John Franklin Luchini, St. Louis, MO (US); Matthew Donald Pulizzi, Normandy, MO (US); Adam Kyle Strachan, Golden, CO (US); Corey Michael Vasel, Arnold, MO (US); Alexander James Peiffer, St. Louis, MO (US); Marc Pascal Doering, St. Louis, MO (US); Briton Rand Bauerly, Kirkwood, MO (US); Samuel David King, O'Fallen, MO (US)

(73) Assignee: Intramotev Inc., St. Louis, MO (US)

( * ) Notice: Subject to any disclaimer, the term of this patent is extended or adjusted under 35 U.S.C. 154(b) by 89 days.

(21) Appl. No.: 18/522,968

(22) Filed: Nov. 29, 2023

(65) Prior Publication Data

US 2025/0171061 A1 May 29, 2025

(51) Int. Cl.
B61L 25/02 (2006.01)
B61L 23/04 (2006.01)
G01S 19/47 (2010.01)

(52) U.S. Cl.
CPC ............. B61L 25/02 (2013.01); B61L 23/042 (2013.01); G01S 19/47 (2013.01); B61L 2205/04 (2013.01)

(58) Field of Classification Search
CPC ............................... B61L 25/02; B61L 23/042
See application file for complete search history.

(56) References Cited

U.S. PATENT DOCUMENTS

| | | | |
|---|---|---|---|
| 12,158,333 B1* | 12/2024 | Hailey .................. G01B 11/24 |
| 2005/0253926 A1 | 11/2005 | Chung | |
| 2007/0216771 A1* | 9/2007 | Kumar ................... B61L 27/53 |
| | | | 348/148 |

(Continued)

OTHER PUBLICATIONS

International Search Report and Written Opinion for corresponding PCT application No. PCT/US2024/057733 dated Feb. 14, 2025.

*Primary Examiner* — Long T Tran
(74) *Attorney, Agent, or Firm* — McDonnell Boehnen Hulbert & Berghoff LLP

(57) ABSTRACT

Example embodiments relate to train data recorder and event notification systems and techniques for using such systems. An example device includes a housing configured to attach onto a train with multiple sensors located in the housing, such as a Global Navigation Satellite System (GNSS) receiver, an inertial measurement unit (IMU), and a camera that can capture images of an environment outside the housing. The device also includes a memory and a processor located inside the housing where the processor is configured to receive sensor data from at least one of the sensors and store the sensor data on the memory. A central computing system can aggregate location-based data generated by train data recording devices positioned on one or multiple trains and map the data to the network of train tracks to detect trends and provide insights to operators.

20 Claims, 10 Drawing Sheets

(56) References Cited

U.S. PATENT DOCUMENTS

| 2010/0063657 | A1* | 3/2010 | Kumar | B61L 25/025 |
| | | | | 701/19 |
| 2015/0021444 | A1 | 1/2015 | Goergen | |
| 2016/0046308 | A1* | 2/2016 | Chung | B61L 27/04 |
| | | | | 701/20 |
| 2018/0222505 | A1* | 8/2018 | Chung | B61L 15/0027 |
| 2020/0207389 | A1* | 7/2020 | Moth | B61L 25/025 |
| 2021/0094595 | A1 | 4/2021 | Kälberer et al. | |
| 2022/0306169 | A1 | 9/2022 | Wang et al. | |
| 2022/0326395 | A1* | 10/2022 | Laviron | G01S 19/13 |
| 2023/0311962 | A1 | 10/2023 | Teixeira et al. | |
| 2024/0174273 | A1* | 5/2024 | Luchini | B60T 8/1705 |
| 2024/0174274 | A1* | 5/2024 | Palmer | B61L 23/041 |

* cited by examiner

800

RECEIVE SENSOR DATA FROM AT LEAST ONE
SENSOR

802

STORE THE SENSOR DATA ON A MEMORY LOCATED
INSIDE THE HOUSING

804

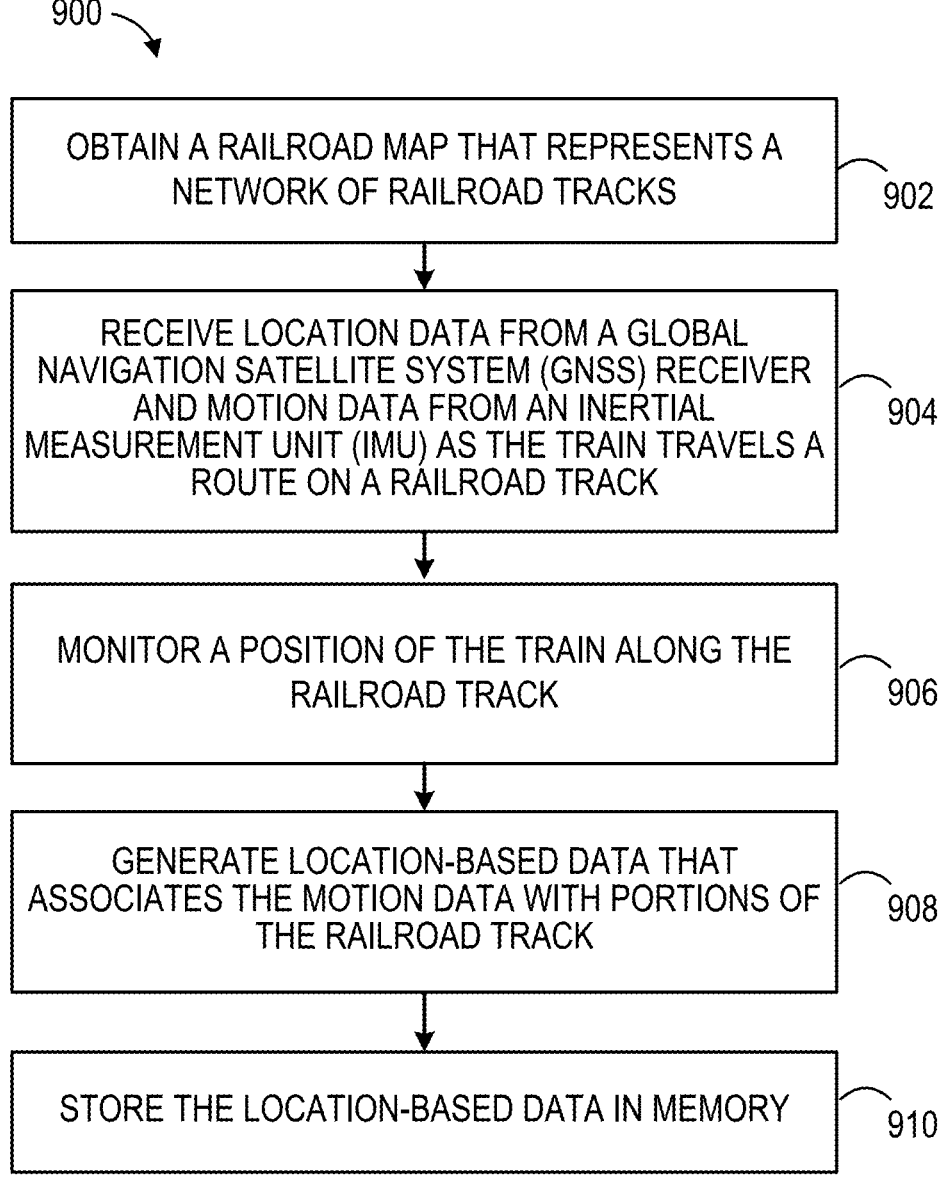

900

OBTAIN A RAILROAD MAP THAT REPRESENTS A
NETWORK OF RAILROAD TRACKS
902

RECEIVE LOCATION DATA FROM A GLOBAL
NAVIGATION SATELLITE SYSTEM (GNSS) RECEIVER
AND MOTION DATA FROM AN INERTIAL
MEASUREMENT UNIT (IMU) AS THE TRAIN TRAVELS A
ROUTE ON A RAILROAD TRACK
904

MONITOR A POSITION OF THE TRAIN ALONG THE
RAILROAD TRACK
906

GENERATE LOCATION-BASED DATA THAT
ASSOCIATES THE MOTION DATA WITH PORTIONS OF
THE RAILROAD TRACK
908

STORE THE LOCATION-BASED DATA IN MEMORY
910

Figure 9

METHODS AND SYSTEMS FOR AGGREGATING AND LEVERAGING LOCATION-BASED DATA GENERATED BY TRAIN RECORDER DEVICES

FIELD

The present disclosure relates generally to train data recording devices that can be attached to trains (e.g., rail cars and/or locomotives), and more particularly to systems and techniques for aggregating and analyzing data captured by such devices when positioned onboard trains during travel.

BACKGROUND

As an integral part of modern transportation systems, trains are used to move both freight and passengers efficiently and cost-effectively. Freight trains are capable of carrying large quantities of goods over long distances, which makes them particularly useful for various industries, such as agriculture, manufacturing, and mining. Freight trains are often more fuel efficient than alternative options and able to move freight much farther on a single gallon of fuel when compared to trucks, thereby reducing overall greenhouse gas emissions and transportation costs. As for passengers, trains provide a convenient mode of transportation, especially for medium to long-distance travel. Passenger trains also help reduce road congestion and offer a sustainable mobility option for many.

However, despite their many advantages, trains are not without their challenges and vulnerabilities. Trains occasionally experience accidents that can occur due to various reasons, including rail deformation, signal failures, human error, and adverse weather conditions. Rail deformation, such as warping or buckling, can cause trains to derail if not promptly detected and addressed. In some cases, accidents involving trains can have devastating consequences, including injuries, loss of life, and damage to property. Thus, ensuring the safety of train operations through regular maintenance, advanced signaling systems, and supportive training for personnel can help mitigate these risks. Therefore, there exists a need to gather data that can help identify and localize potential issues that could disrupt the ability for trains to operate effectively.

SUMMARY

Example embodiments relate to train data recorder and event notification devices and techniques for using such devices to aggregate data for monitoring and enhancing the performance of trains and railway infrastructure. Disclosed devices can be positioned onboard trains and include various types of sensors that are able to generate data about train operations and the external environment experienced during travel. Data generated by one or multiple devices can be aggregated by a central computing system and used for various purposes, such as monitoring the health of trains and rail equipment, predicting when maintenance of components is needed, analyzing events that occur during travel, increasing operational efficiency, and complying with safety and regulatory standards.

Accordingly, a first example embodiment describes a device. The device includes a housing configured to attach onto a train and a plurality of sensors located inside the housing. The plurality of sensors includes a Global Navigation Satellite System (GNSS) receiver, an inertial measurement unit (IMU), and a camera having a lens that is positioned relative to an opening in the housing such that the camera can capture images of an environment outside the housing. The device also includes a memory located inside the housing and a processor. The processor is configured to receive sensor data from at least one of the plurality of sensors and store the sensor data on the memory.

Another example embodiment describes a method. The method involves receiving, at a processor, sensor data from at least one of a plurality of sensors. The plurality of sensors are located within a housing removably attached to a train and includes a GNSS receiver, an IMU, and a camera. A lens of the camera is positioned relative to an opening in the housing such that the camera can capture images of an environment located outside the housing. The method also involves storing, by the processor, the sensor data on a memory located inside the housing.

An additional example embodiment describes a system. The system includes a train and a device attached to the train. The device includes a housing and a plurality of sensors located inside the housing. The plurality of sensors includes a Global Navigation Satellite System (GNSS) receiver, an inertial measurement unit (IMU), and a camera having a lens that is positioned relative to an opening in the housing such that the camera can capture images of an environment outside the housing. The device also includes a memory located inside the housing and a processor. The processor is configured to receive sensor data from at least one of the plurality of sensors and store the sensor data on the memory.

A further example embodiment describes a non-transitory computer readable medium. The non-transitory computer-readable medium is configured to store instructions, that when executed by a device comprising one or more processors, causes the device to perform operations. The operations involve receiving sensor data from at least one of a plurality of sensors. The plurality of sensors are located within a housing removably attached to a train and includes a GNSS receiver, an IMU, and a camera. A lens of the camera is positioned relative to an opening in the housing such that the camera can capture images of an environment located outside the housing. The operations also involve storing the sensor data on a memory located inside the housing.

Another example embodiment describes a method. The method involves obtaining, at a computing system attached to a train, a railroad map that represents a network of railroad tracks and receiving, at the computing system, location data from a Global Navigation Satellite System (GNSS) receiver and motion data from an inertial measurement unit (IMU) as the train travels a route on one or more railroad tracks of the network of railroad tracks. The method further involves monitoring a position of the train along the one or more railroad tracks based on the railroad map and location data, generating location-based data that associates the motion data with portions of the one or more railroad tracks, and storing the location-based data in memory.

An additional example embodiment describes a non-transitory computer-readable medium configured to store instructions, that when executed by a computing system comprising one or more processors, causes the computing system to perform operations. The operations involve obtaining a railroad map that represents a network of railroad tracks and receiving location data from a Global Navigation Satellite System (GNSS) receiver and motion data from an inertial measurement unit (IMU) as a train travels a route on one or more railroad tracks of the network of railroad tracks. The operations also involve monitoring a position of the train along the one or more railroad tracks based on the railroad map and location data, generating location-based data that associates the motion data with portions of the one or more railroad tracks, and storing the location-based data in memory.

A further example embodiment describes a method. The method involves aggregating location-based data from a plurality of computing devices coupled to a plurality of trains. Each computing device includes a Global Navigation Satellite System (GNSS) receiver configured to provide location data and an inertial measurement unit (IMU) configured to provide movement data. A first computing device is attached to a first train and provides first location-based data based on first location data and first movement data obtained as the first train travels a first route on one or more railroad tracks of a network of railroad tracks and a second computing device is attached to a second train and provides second location-based data based on second location data and second movement data obtained as the second train travels a second route on one or more railroad tracks of the network of railroad tracks. The method further involves mapping the location-based data to the network of railroad tracks.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 9 is a flowchart of a method for generating location-based data while a train travels a route, according to one or more example embodiments.

DETAILED DESCRIPTION

Figure 1:
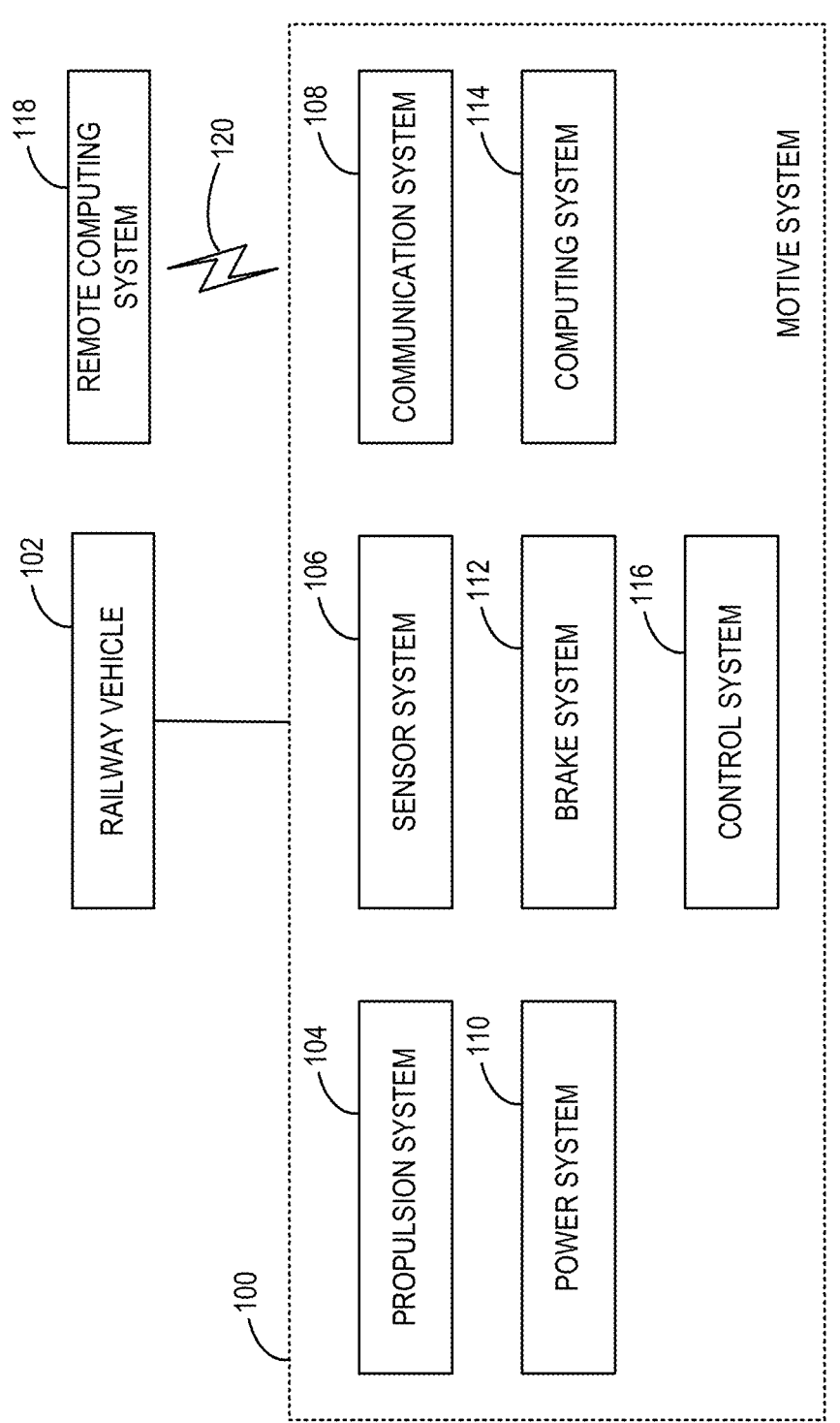
FIG. 1 is a functional block diagram illustrating a motive system for a railway vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Recording information regarding the conditions of a train and the areas traversed by the train, including the rails, ties, fasteners, train signals, and ballast, can help identify potential problems and reduce the occurrence of accidents. Such information can help train operators and route planners identify inefficiencies in the application of power or brakes and enable efficient management of train fleets. Most trains, however, lack the capability to record information about the condition of a train as well as the condition of areas navigated by the train. Moreover, completely replacing existing train fleets with sensor-equipped trains is impracticable for multiple reasons, including high costs. Thus, there is a need for a solution that can gather such information from existing freight rail cars and other types of train rail cars without the high costs associated with complete replacement of existing train cars.

Example embodiments relate to train data recording devices and techniques for using such devices to record information about the local environment around a train during travel and capture measurements regarding the performance of the train. Disclosed data recorder and event notification devices are designed to be attached onto existing trains (and easily removed after installation), thus reducing costs compared with completely replacing existing train cars. Further, example devices can be fully self-contained in some configurations without the requirement for external storage or power and can communicate event notifications as well as other information to other devices. Some examples further involve a central computing system aggregating and utilizing data generated by the train data recording devices to identify potential issues and optimize train routes and performance.

By way of an example, a recorder and event notification device includes a housing configured to attach to a train and one or multiple sensors located inside the housing for gathering data during train operations. For attaching the housing of the device to a train, various equipment or mounts can be used within examples. In some cases, the device can be attached permanently onto a given location of a locomotive or another type of railcar (e.g., a freight rail car). Some example ways of permanently attaching the device onto the train car include bolting or welding, bracket mounting, rack or enclosure installation, and/or drilling and anchoring. In other cases, removable attachment components can be used to enable the device to be temporarily positioned on the train and subsequently removed if desired. Some examples of removable attachment techniques include using clamps or mounting straps, magnetic mounts, suction cups, hook-and-loop fasteners, adhesive mounts, clips and latches, and/or slide-in mounts. Temporarily connecting the device onto the train can allow the device to be subsequently moved to another location on the train or to another train if desired. As such, other ways for connecting the device onto the train are possible and selection of the mounting means can depend on the weather conditions typically encountered by the train using the device.

Within examples, disclosed devices can include or multiple types of sensors to gather different data during operation of the train. For instance, the device can include one or more of a Global Navigation Satellite System (GNSS) receiver, an inertial measurement unit (IMU), a camera, a radar, a temperature sensor, a wind sensor, a lidar, microphones, and a pressure sensor, among others. The quantity, type, and arrangement of the sensors can differ within examples and may depend on the desired cost and use of the device. For instance, a device constructed to analyze the condition of railways can have particular sensors that accurately measure the properties of the railways as the train travels in order to allow a thorough diagnosis to be generated for the railways using the sensor data. In general, the housing can be designed and constructed to accommodate the different types of sensors. For instance, the housing can include an opening for the lens of the camera to extend through to enable the camera to capture clear images of the external environment. Multiple cameras can be used to generate images or video. In some examples, one or multiple sensors can be positioned at a different location on the train and communicate with the device. For instance, the device may include an internal camera and a supplementary camera can be added at another location on the train to enable images from different angles to be captured during travel.

In addition to the sensors, the device can also include one or multiple types of memory located inside the housing and one or multiple types of processors that can perform operations, such as the operations disclosed herein. For instance, the processor can aggregate and store data obtained via the sensors operating as part of the device.

The device can also include a communication interface that allows communication with other devices, such as onboard devices used by a train operator and remote computing systems. The communication interface can include various types of wired and/or wireless communication technologies, such as Ethernet, Universal Serial Bus (USB), High-Definition Multimedia Interface (HDMI), fiber optics, power line communication (PLC), Wi-Fi, Bluetooth, Bluetooth Low Energy (BLE), Cellular module, Near Field Communication (NFC), Radio-Frequency Identification (RFID), ZigBee, Long Range (LoRa), and Satellite Communication. The communication interface can enable transfer of data between the device and remote computing systems and can also enable a remote operator to provide instructions or data to the device. In some cases, the communication interface can provide alerts or other notifications to remote operators or computing systems based on measurements obtained via one or more sensors of the device. For instance, sensor data from an IMU or another sensor may indicate that the train experienced an event (e.g., a collision), which triggers the device to transmit a notification alert to one or multiple remote computing systems.

Aggregating data using one or multiple disclosed devices during train operations can play a significant role in detecting train derailments, evaluating the condition of a train equipped with the devices, and other potential issues in the railroad industry by providing a comprehensive view of various factors that could lead to accidents or operational problems. In particular, disclosed devices can be positioned onboard locomotives and/or freight vehicles to aggregate data, which can be used to derive various benefits. In general, the position and means of attaching the devices onto a train car can vary within examples and may depend on the desired angle or orientation of one or more sensors within the device. For example, different types of physical mounts can be used to secure the devices onto a railway vehicle at an orientation that allows the sensors of the device to capture measurements of the train's movements and surrounding environment. As such, the device(s) can capture, store, analyze, and transmit data acquired by sensors as the train travels along tracks.

The data obtained from a device positioned onboard a train can be used to improve performance of that particular train and also analyze the health of railways traversed by the train. In some embodiments, data accumulated by multiple disclosed devices positioned onboard a variety of trains can be aggregated by a central computing system and used to analyze trends across the trains and various railways traveled by the trains. The individual devices can report events and transmit data to the central computing system, which can leverage the data to detect issues with tracks, identify potential issues, monitor trends, and perform other actions. The central computing system can share data with individual devices, train operators, route planners, and maintenance crews to help mitigate potential issues before they occur.

In some cases, the acquired data can be used to monitor equipment health. The devices can use a vast array of sensors and monitoring equipment to collect data on factors like wheel temperature, axle load, track condition, and more. Aggregating this sensor data from one or multiple devices can allow operators to monitor the health of their equipment over time. Any unusual fluctuations or patterns in the data can indicate potential issues with train components, such as overheating wheels or worn-out tracks.

In addition, disclosed devices and techniques enable predictive maintenance to be determined and performed on trains, tracks, and other track-related equipment (e.g., signals). For instance, predictive maintenance models can be developed based on aggregated data on the performance and maintenance history of trains and rail infrastructure. The models can use machine learning algorithms to identify trends and patterns in the data, which allows operators to predict when specific components are likely to fail or require maintenance. In some cases, early detection of potential issues through data analysis can prevent derailments and other accidents caused by equipment failures. Devices can map the health of tracks using sensor data, which can be monitored and updated as additional data is obtained from further use of the railways by the trains.

In some examples, disclosed devices can be used to aggregate environmental data for subsequent monitoring. For instance, devices can be positioned onboard trains to measure weather conditions and temperature variations as the trains navigate various routes. Data representing weather conditions and temperature variations can be integrated with other operational data to assess their impact on railway safety and train performance. In some cases, heavy rain, extreme heat, or freezing temperatures can affect track conditions and increase the risk of derailment. By combining these data sources, railway operators can make informed decisions about when to slow down trains or perform track maintenance to mitigate risks.

Disclosed devices also can record and provide notifications related to events. For instance, when a train derailment or incident occurs, aggregating data from various sources, including sensor data, video footage, and maintenance logs, can aid in post-incident analysis. The aggregated data can help train operators and investigators reconstruct the sequence of events leading to the incident, identify contributing factors, and develop preventive measures to avoid similar incidents in the future. In some examples, the device can operate similar to a black box on an aircraft and store sensor data obtained prior to an event for analysis at a later time. The design of the train black box can be implemented to withstand high impact, fire, high temperatures, exposure to water, and other elements.

Data aggregation by the devices can also enhance overall operational efficiency. Analyzing data on train schedules, traffic patterns, and resource allocation can help optimize operations, reduce congestion, and minimize the risk of accidents caused by mismanagement or overcrowding. Data aggregation can also assist rail operators in complying with safety and regulatory standards. By maintaining comprehensive records and aggregating data on safety inspections, maintenance activities, and compliance checks, operators can demonstrate adherence to industry regulations and improve the safety culture.

Some example embodiments involve a central computing system aggregating data from multiple devices, which can be coupled on different trains within the same train set and/or different trainsets. For instance, the central computing system may obtain location-based data generated by the various computing devices and map the aggregated data to the different railway tracks traversed and recorded by the computing devices. The central computing system can monitor tracks and infrastructure based on the location-based data generated and provided by the computing devices attached to the trains. For instance, the central computing system can monitor the real-time status of multiple trains, including their positions, speeds, and schedules. The central computing system can use the data to ensure that the trains are on track, maintaining safe distances, and following the timetables set for each train.

In some cases, the central computing system can use data aggregated from the different devices to optimize traffic flow along various tracks within a network of railway tracks. By analyzing the locations and movements of trains, the computing system can provide route adjustments to trains in real-time and make other modifications to schedules and signaling that can help prevent congestion. The central computing system may detect potential issues or hazards based on location-based data or alerts provided by the computing devices attached to the trains. The central computing system can ensure that trains are operating safely and provide alerts to operators in cases of emergencies or deviations from safety standards. In some examples, the central computing system may perform one or multiple automatic actions to resolve potential issues.

The central computing system may use data from computing devices attached to trains to derive insights into the health and performance of each train. In some instances, the central computing system can analyze this information to predict maintenance needs, identify potential faults or failures, and schedule proactive maintenance. As an example result, the central computing system can assist by providing predictive maintenance alerts that help in preventing unexpected breakdowns and reducing downtime of the trains. In addition, by gathering information on train operations (e.g., acceleration, braking, and speed profiles), the central computing system can determine and provide strategies that can be used to optimize energy consumption. The strategies can help reduce operational costs and environmental impact associated with using the trains along various routes.

The central computing system can also improve passenger information and services by aggregating and analyzing the data from computing devices coupled on various trains. The data from the computing devices can be used by the central computing system to monitor train occupancy, delays, and disruptions to provide real-time updates, which can be used by passengers. As such, the central computing system can provide information that helps manage passenger expectations, improves the passenger experience, and ensures timely communication about changes or issues. In some cases, the central computing system can also analyze historical data from devices attached on various trains to identify patterns, trends, and areas for improvement. The data-driven approach enabled by aggregating the location-based data can be used to help in enhancing overall operations, scheduling, and infrastructure planning for the railway network. Overall, the central computing system can leverage information from computing devices attached to various trains to ensure the smooth functioning of the railway network, enhance safety measures, optimize operations, and improve overall efficiency and reliability of train services.

In some examples, the central computing system and/or the computing devices coupled to the trains can leverage machine learning to enhance their capabilities and outputs. For instance, machine learning can enhance how the central computing system analyzes the vast amount of data collected from various computing devices attached to trains in a railway network. The central computing system may use machine learning algorithms to predict potential maintenance issues by analyzing data obtained from computing devices attached to various trains. These algorithms can identify patterns in sensor data produced by sensors communicating with the computing devices, such as temperature, vibration, or engine performance, to forecast when components might fail. The central computing system can then help in scheduling maintenance before breakdowns occur, reducing downtime and improving reliability. Similarly, the computing system can also use machine learning models to learn normal operation patterns experienced by computing devices coupled to trains. The models can then be used to identify anomalies or deviations that can represent unusual behavior or errors. For instance, the models can be used to detect potential malfunctions or safety issues. By analyzing large volumes of data, machine learning models can be used by the computing system to recognize patterns and trends that might not be evident to human analysts. This could include identifying trends in passenger loads, weather-related disruptions, or maintenance requirements over time, helping in planning and resource allocation.

In some examples, the computing system can use machine learning to process historical and real-time data obtained by the various computing devices positioned on trainsets. Such information can be used to forecast demand, adjust routes, and predict potential congestion points, enabling the central computing system to make dynamic adjustments to prevent delays or optimize routes for better efficiency. Machine learning can also be used to analyze data on train operations and identify opportunities for optimizing energy consumption. For instance, the central computing system may develop strategies that can be communicated to train conductors and schedulers that enable a more efficient use of power, such as adjusting acceleration and braking patterns, to reduce energy usage without compromising schedules. The central computing system can also continuously learn from various train operation data to improve safety measures. For instance, the computing system can predict potential collision risks, identify unsafe operational patterns, or even analyze video feeds for detecting potential safety hazards on tracks. Machine learning can also be used to analyze passenger data to optimize services for passengers, such as travel habits, preferences, and peak times.

Data aggregation can be used for health, maintenance, and troubleshooting errors. For instance, the computing device can perform internal tests that are run to check the health of the system. If any test fails, a fault code is set with a timestamp. The fault code can then be looked up to determine what maintenance action should be performed to remove the fault (e.g., replacing the part that failed). Data aggregation can be used to determine why (debugging) any error that has not been seen previously (doesn't have a specific fault code) using the timestamp at the time the error occurred.

I. Example Systems

Referring now to the figures, FIG. 1 is a functional block diagram showing motive system 100, which can be implemented on railway vehicle 102 and configured to perform disclosed operations. In the example embodiment, motive system 100 may include various subsystems, such as propulsion system 104, sensor system 106, communication system 108, power system 110, brake system 112, computing system 114, and control system 116. In other examples, motive system 100 may include more or fewer subsystems. In addition, the subsystems and other components of motive system 100 can be interconnected via wired or wireless connections and operations performed by motive system 100 can be divided into additional functional or physical components and/or combined into fewer functional or physical components within examples. One or multiple disclosed devices can be used to position onto railway vehicle 102 in some examples.

Railway vehicle 102 represents any type of vehicle that can transport people and/or cargo on a railway. In some examples, railway vehicle 102 may be a freight car or a flatcar configured to move materials or other types of materials. In particular, railway vehicle 102 is a burdened rail vehicle in some embodiments. Traditional locomotives are unburdened (i.e., not carrying payload) whereas traditional freight railcars are unpowered and serve to carry payloads similar to trailers as burdened vehicles. As such, the size, shape, and configuration of railway vehicle 102 can differ within examples. In addition, the number and types of axles and wheels on railway vehicle 102 can vary. Generally, railway vehicle 102 may include two axles per truck with two trucks per railcar. Railway vehicle 102 may include one or multiple types of couplers that enable railway vehicle 102 to be coupled to other railway vehicles.

Motive system 100 may include propulsion system 104 in some examples. As such, propulsion system 104 may include one or multiple components configured to supply powered motion for railway vehicle 102. For instance, propulsion system 104 may include one or multiple motors that can use power from power system 110 to generate torque to rotate wheels of railway vehicle 102. In some embodiments, propulsion system 104 may include multiple types of engines and/or motors.

Sensor system 106 may include one or multiple types of sensors that can be used to enhance the performance of railway vehicle 102. Generally, sensor system 106 can be utilized to understand the environment of railway vehicle 102, the performance of components of railway vehicle 102, and enable tailoring performance of railway vehicle 102 towards the environment. For instance, sensor system 106 may include one or more radars, lidars, cameras, wind sensors, force sensors, contact sensors, precipitation sensors, light sensors, humidity sensors, strain gauges, thermal imaging, radio navigation units, encoders, resolvers, laser range finding sensors, Radio-Frequency Identification (RFID) sensors, gyroscopes and/or magnetometers, accelerometers, magnetic sensors, microphones, strain and weight sensors, Global Positioning Systems (GPS), inertial measurement units (IMUs), passive infrared sensors, ultrasonic sensors, wheel speed sensors, and/or throttle/brake sensors, among other possibilities. Sensor system 106 may also include one or multiple sensors configured to monitor existing components of railway vehicle 102. In addition, sensor system 106 can use multiple sensors to provide for safety redundancy.

Various sensors from sensor system 106 can be placed on different components of railway vehicle 102. For instance, some sensors can be positioned on couplers while others are housed in a particular container positioned near a front or a rear end of railway vehicle 102. Some sensors can measure aspects of couplers positioned on railway vehicle 102. For instance, these sensors can indicate the stress level on couplers, among other information.

In some examples, sensor system 106 may include one or multiple sensors that can detect waypoints positioned along a railway track. Sensor system 106 may also enable railway vehicle 102 to triangulate its position relative to off board radio stations and/or other sources of communication signals, such as 4G or 5G towers. Sensor system 106 can also be used to weigh railway vehicle 102 and adjust performance of electric motors and/or other components located on railway vehicle 102. In some examples, sensor system 106 can be supplemented by one or multiple devices disclosed herein.

In some examples, a motor encoder and/or resolver data can be used to detect wheel slipping on railway vehicle 102 due to wet, icy, or debris laden tracks. In response, computing system 114 may then implement effective control strategies. Onboard sensors can be used to detect vandals in some embodiments. Computing system 114 may use cameras and radar to detect potential vandalism and responsively transmit signals to a user and/or authorities to protect cargo and payloads via communication system 108. In addition, sensor system 106 can be used for automated track inspections and to determine rail condition. In some cases, computing system 114 may determine deviation from normal rail characteristics based on sensor data from sensor system 106. For instance, computing system 114 may detect railcar hunting, vibration, and/or other dynamics based on sensor data.

As further shown in FIG. 1, motive system 100 may include communication system 108, which may be used to communicate with one or more devices (e.g., remote computing system 118) directly or via a communication network (e.g., wireless connection 120). In some examples, communication system 108 may include one or multiple dedicated short-range communications (DSRC) devices that could include public and/or private data communications with stations positioned near tracks.

Power system 110 may include one or multiple power sources that can supply power to different components of motive system 100 and/or railway vehicle 102. For instance, power system 110 may include batteries, petroleum-based fuels, gas-based fuels, solar panels, among other types of power generation sources. In some example embodiments, power system 110 may include a combination of batteries, capacitors, and/or flywheels. In some cases, power system 110 may be shared across multiple railway vehicles within a train set. For instance, direct electrical connections can exist between power systems on different railway vehicles. In addition, multiple power systems can be used to share energy in optimal ways, such as using an overcharged battery pack to kinetically recharge a depleted or lower state of charge battery pack. In some examples, power system 110 can supply power to one or multiple train recording devices described herein.

Brake system 112 may represent one or multiple supplementary brake systems that motive system 100 may include to further enhance performance of railway vehicle 102. The primary braking system can be pneumatic, with brake airlines pressurized from compressors on board the locomotive, and used in conjunction with brake system 112. For instance, brake system 112 is a regenerative brake system in some embodiments. As a regenerative system, brake system 112 can serve as an energy recovery mechanism that also slows down the railway vehicle by converting its kinetic energy into a form that can be used immediately or stored until needed. For instance, brake system 112 can convert kinetic energy into energy stored by one or more batteries of power system 110. In some instances, brake system 112 can dissipate the energy as heat, such as when the battery storage on railway vehicle 102 is full.

In some embodiments, brake system 112 can be a regenerative braking system that can be used to feed electricity directly into the electrical grid through overhead catenary lines or other technologies (e.g., third rails used for power). Brake system 112 can also be used during short sections of track without requiring full electrification of the track lines to take advantage of traditional un-electrified rail as well as short electrified sections for recharging and returning power to the grid.

Computing system 114 represents one or multiple computing devices that can perform operations, such as the various operations described herein. Computing system 114 may include one or multiple processors that can execute instructions stored in a non-transitory computer readable medium (e.g., data storage). The instructions can enable computing system 114 to operate with the various subsystems of motive system 100 and other computing devices (e.g., remote computing system 118). In some examples, motive system 100 may use communication system 108 to communicate with remote computing system 118 over wireless connection 120. In addition, computing system 114 may include one or multiple user interface elements to enable users to provide instructions and/or receive information from motive system 100. For instance, computing system 114 may include one or more input/output devices, such as a touchscreen, speaker, and microphone, etc.

In some embodiments, computing system 114 is designed to be self-redundant in order to offer duplex or triplex redundancy in case of a partial system failure. This allows for computing system 114 to continue operations safely in case of a failure as well as to have a redundant system verifying and validating sensor inputs received from sensor system 106.

Control system 116 can include one or multiple components designed to assist in the operations of railway vehicle 102. For instance, control system 116 can include components that enable control of other components of motive system 100 and/or a proportional-integral-derivative controller (PID controller or three-term controller) that is a control loop mechanism employing feedback that is widely used in industrial control systems and a variety of other applications requiring continuously modulated control.

Remote computing system 118 represents a computing system that may provide information and/or control instructions to motive system 100 and/or railway vehicle 102. For instance, remote computing system 118 may be a smart-phone, server, laptop, and/or another type of device that enables inputs to different components within motive system 100.

Motive system 100 can include other pneumatic elements for auxiliary services, such as dump, gate, or door actuation. These systems can be actuated via solenoids remotely or manually. Gate or door actuation can be supplied from the same compressors or completely separate air systems from the brake air infrastructure. In addition, motive system 100 can also include additional systems, such as a cooling system that can service the needs of other systems. For instance, the cooling system can cool onboard battery storage, electric motors, inverters using liquid or air cooled subsystems in order to keep the components in satisfactory operating temperatures. In some implementations, compressors and air drying/treating equipment for pneumatic systems can use a cooling system. As such, cooling systems could link between other systems on a single loop, in series or parallel. In other cases, each system may have its own subsystem for cooling. A combination of a master cooling system and additional cooling subsystems can be used in other examples.

Figure 2:
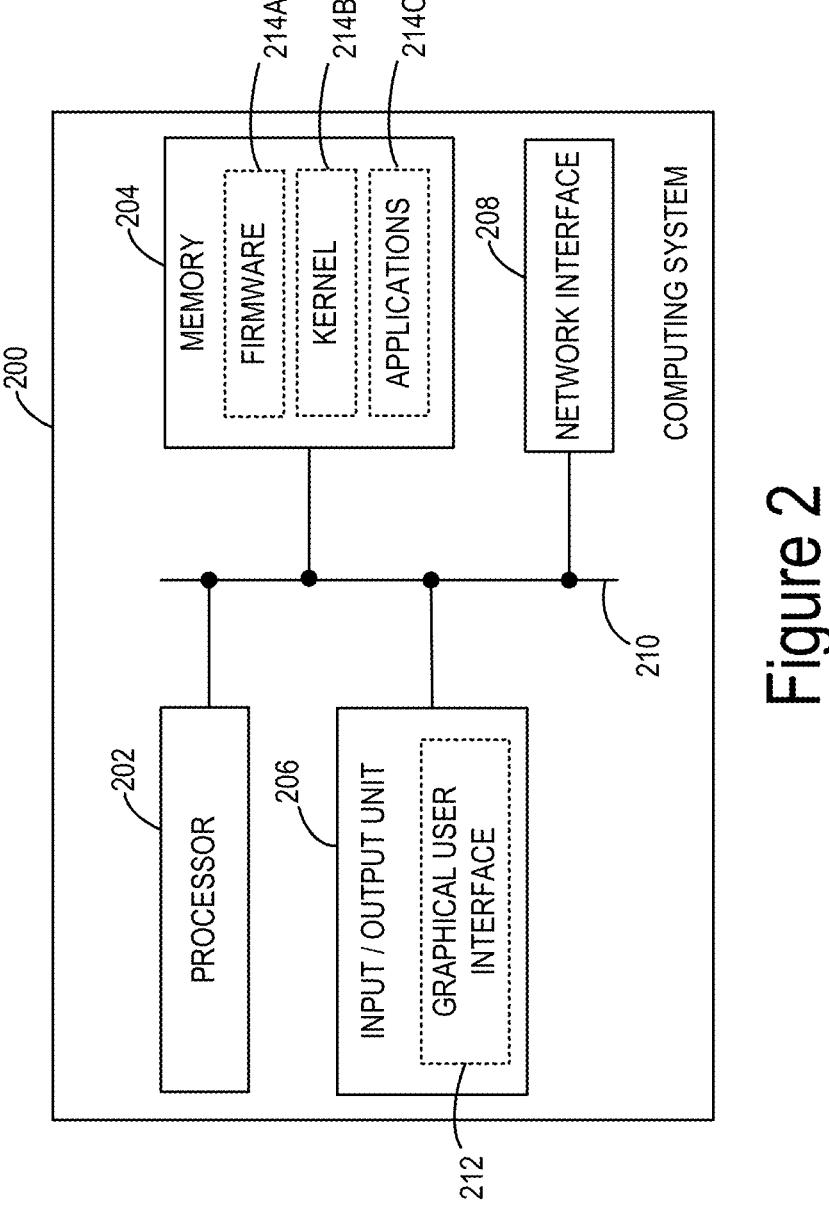
FIG. 2 is a functional block diagram illustrating a computing system, according to one or more example embodiments.

FIG. 2 is a block diagram of computing system 200, illustrating some of the components that could be included in a computing device arranged to operate in accordance with the embodiments herein. As such, computing system 200 may be implemented as computing system 114 of motive system 100 and/or remote computing system 118 shown in FIG. 1. In some examples, computing system 200 may communicate with one or more accessories attached to a railway vehicle via one or more bearing adapters.

In the example embodiment shown in FIG. 2, computing system 200 includes processor 202, memory 204, input/output unit 206, and network interface 208, all of which may be connected by a system bus 210 or a similar mechanism. In some example embodiments, computing system 200 may include other components and/or peripheral devices (e.g., detachable storage and/or sensors).

Processor 202 may be one or more of any type of computer processing element, such as a central processing unit (CPU), a co-processor (e.g., a graphics processor), a digital signal processor (DSP), a network processor, and/or a form of integrated circuit or controller that performs processor operations. As such, processor 202 may be one or more single-core processors and/or one or more multi-core processors with multiple independent processing units. In addition, processor 202 may also include register memory for temporarily storing instructions being executed and related data, as well as cache memory for temporarily storing recently-used instructions and data.

Memory 204 may be any form of computer-usable memory, including but not limited to random access memory (RAM), read-only memory (ROM), and non-volatile memory. This may include flash memory, hard disk drives, solid state drives, rewritable compact discs (CDs), rewritable digital video discs (DVDs), and/or tape storage, as just a few examples. Computing system 200 may include fixed memory as well as one or more removable memory units, the latter including but not limited to various types of secure digital (SD) cards. As an example result, memory 204 can represent both main memory units as well as long-term storage. Memory 204 may store program instructions and/or data on which program instructions may operate. By way of example, memory 204 may store these program instructions on a non-transitory, computer-readable medium, such that the instructions are executable by processor 202 to perform any of the methods, processes, or operations disclosed in this specification or the accompanying drawings.

As shown in FIG. 2, memory 204 may include firmware 214A, kernel 214B, and/or applications 214C. Firmware 214A may be program code used to boot or otherwise initiate some or all of computing system 200. Kernel 214B may be an operating system, including modules for memory management, scheduling and management of processes, input/output, and communication. In addition, kernel 214B may also include device drivers that allow the operating system to communicate with the hardware modules (e.g., memory units, networking interfaces, ports, and busses) of computing system 200. Applications 214C may be one or more user-space software programs, such as web browsers or email clients, as well as any software libraries used by these programs. In some examples, applications 214C may include one or more control systems 116, neural network applications and other deep learning-based applications. Memory 204 may also store data used by these and other programs and applications.

Input/output unit 206 may facilitate user and peripheral device interaction with computing system 200, sensors, and/or other computing systems, such as computing systems on other railway vehicles and/or positioned remote from a train. Input/output unit 206 may include one or more types of input devices, such as a keyboard, a mouse, one or more touch screens, sensors, biometric sensors, and so on. Similarly, input/output unit 206 may include one or more types of output devices, such as a screen, monitor, printer, speakers, and/or one or more light emitting diodes (LEDs). Additionally or alternatively, computing system 200 may communicate with other devices using a universal serial bus (USB) or high-definition multimedia interface (HDMI) port interface, for example. In some examples, input/output unit 206 can be configured to receive data from other devices. For instance, input/output unit 206 may receive sensor data from sensors, such as sensors positioned on a railway vehicle. As shown in FIG. 2, input/output unit 206 includes Graphical User Interface (GUI) 212, which can be configured to provide information to a user. GUI 212 may involve one or more display interfaces, or another type of mechanism for conveying information and receiving inputs. Some common rail techniques can involve signal lighting, horns, and bells, which can be implemented via input/output unit 206. With many techniques in traditional rail being visual and auditory in nature, these techniques in addition to more advanced signaling and human machine interfaces can be implemented.

Network interface 208 may take the form of one or more wireline interfaces (e.g., Ethernet) and/or enable communication over one or more wireless interfaces, such as IEEE 802.11 (Wi-Fi), BLUETOOTH®, global positioning system (GPS), 3G, 4G, 5G, or a wide-area wireless interface. In addition, other forms of physical layer interfaces and other types of standard or proprietary communication protocols may be used over network interface 208.

II. Example Railway Vehicle Configurations

Figure 3:
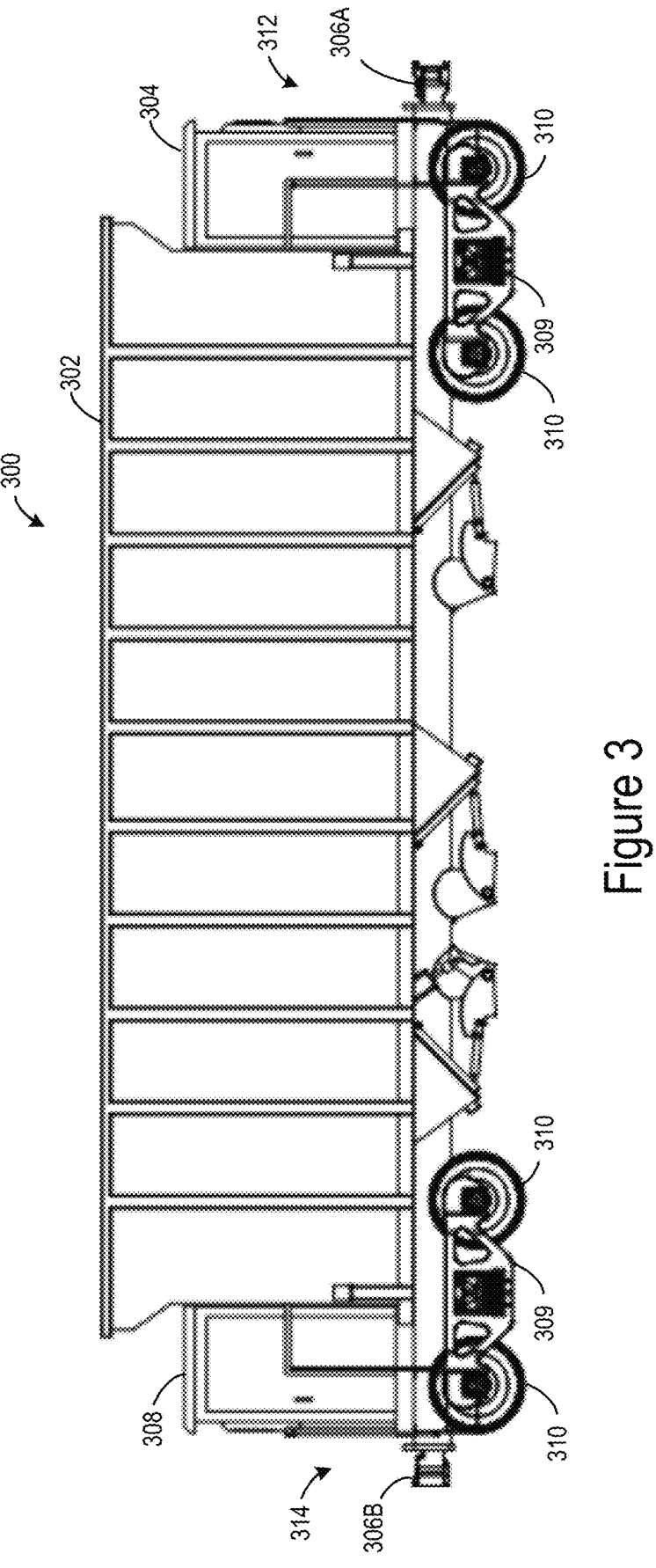
FIG. 3 is a configuration of a railway vehicle with a motive system, according to one or more example embodiments.

FIG. 3 illustrates a configuration of railway vehicle 302 equipped with motive system 300. In the example embodiment, motive system 300 is implemented on railway vehicle 302 and includes sensor system 304 positioned near front coupler 306A and battery storage 308 located near rear coupler 306B. Railway vehicle 302 may include one or more train recording and event notification devices described herein.

In the example embodiment, railway vehicle 302 is shown as a freight vehicle designed to carry materials and other cargo between locations. Railway vehicle 302 has front side 312 and rear side 314 in the example embodiment, which can each be attached to different railway vehicles within a trainset via front coupler 306A and rear coupler 306, respectively. As shown, railway vehicle 302 includes bogies 309 (or trucks) that enable movement on wheels 310. As such, motive system 300 can involve installation of one or multiple components (e.g., electric motors, braking systems) on bogies 309 via one or more bearing adapters and other components of railway vehicle 302. Railway vehicle 302 can have alternative configurations within other embodiments. In addition, railway vehicle 302 can be part of a train that includes one or multiple railway vehicles equipped with motive systems 300.

Motive system 300 can be implemented as motive system 100 shown in FIG. 1 and can include one or more electric drive systems and an auxiliary braking system that can enable motive system 300 to perform operations disclosed herein that can enhance overall performance of railway vehicle 302. For instance, motive system 300 may include one or multiple electric drivetrains that can be used to turn axles connected to wheels 310. In addition, motive system 300 may also include a regenerative braking system that can be used to convert energy from one or more axles and/or wheels 310 and deliver energy to battery storage 308 during braking applications.

Figure 4:
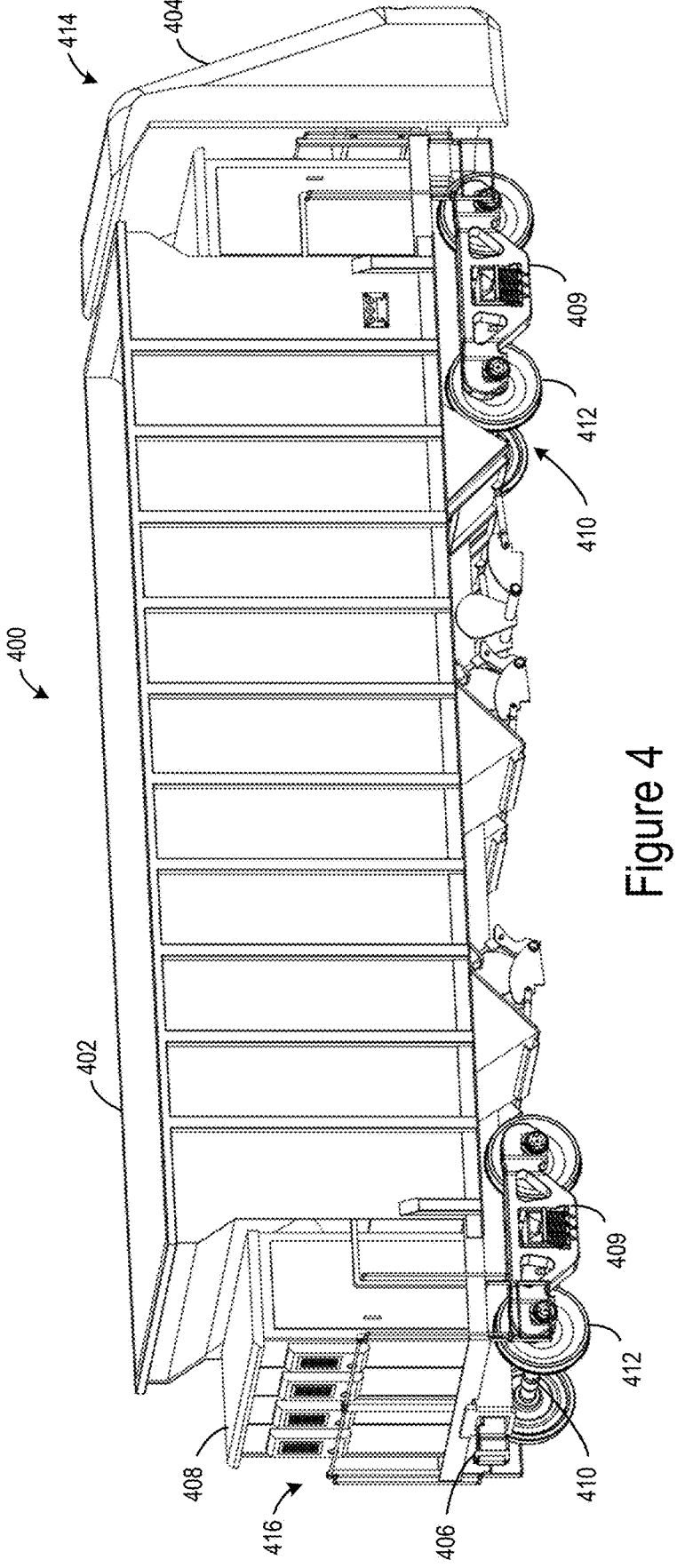
FIG. 4 is another configuration of a railway vehicle with a motive system, according to one or more example embodiments.

FIG. 4 illustrates another configuration of railway vehicle 402 configured with motive system 400, which can similarly include components of motive system 100 shown in FIG. 1 and may enable railway vehicle 402 to operate autonomously and without locomotives.

Railway vehicle 402 is similar to railway vehicle 302 shown in FIG. 3, but differs at the front end of railway vehicle 402. In particular, motive system 400 implemented on railway vehicle 402 includes sensor component 404 that may include additional sensors (e.g., cameras, radar) to enable railway vehicle 402 to perform operations typically completed by a locomotive. Railway vehicle 402 includes coupler 406 and bogies 409 configured with axles 410 and wheels 412 as shown in FIG. 4. As such, bogies 409 and disclosed bearing adapters can be used to position motors and/or other components that enable railway vehicle 402 to be self-propelled. In some examples, regenerative braking components can be attached to axles 410, bogies 409, and/or wheels 412. In addition, housing 408 may include batteries and/or other components for motive system 400. Railway vehicle 402 has front side 414 and rear side 416 as shown in FIG. 4. Rear side 416 can be coupled to another railway vehicle within a train set via coupler 406.

Figure 5:
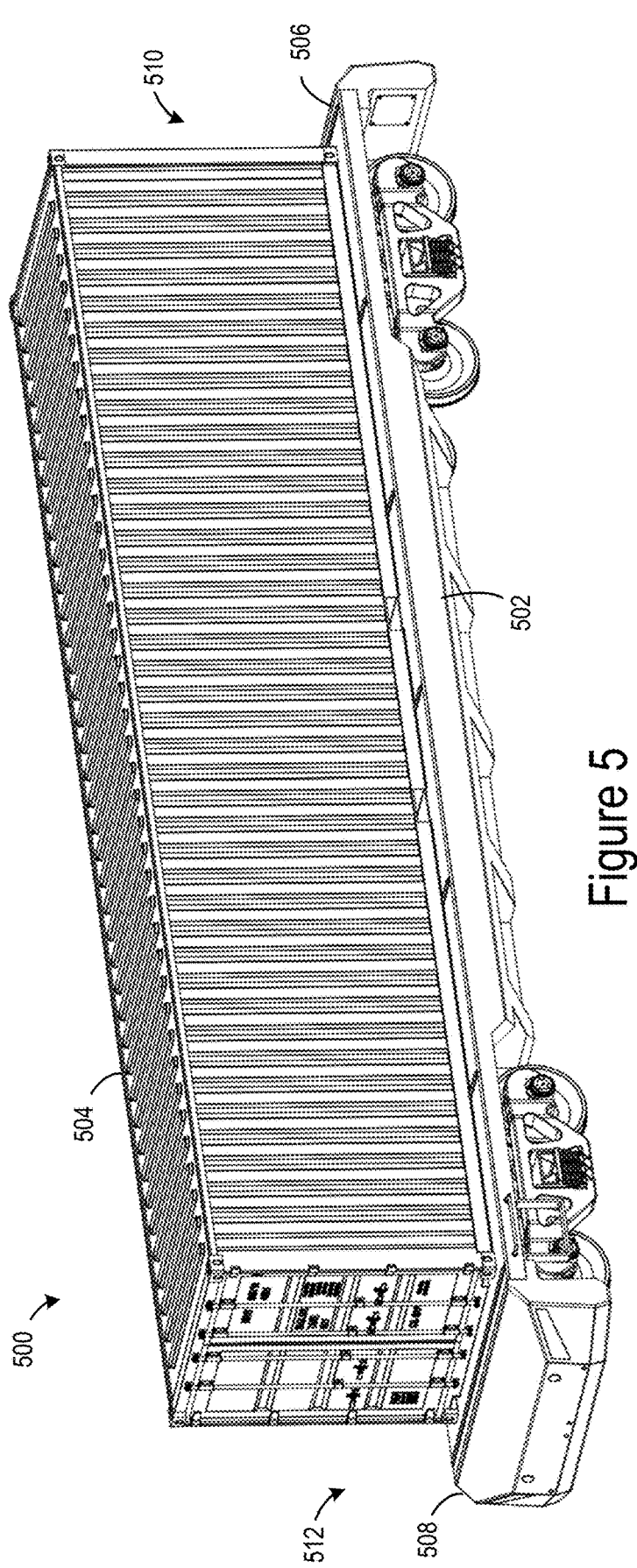
FIG. 5 is an additional configuration of a railway vehicle with a motive system, according to one or more example embodiments.

FIG. 5 illustrates an additional configuration of railway vehicle 502 configured with motive system 500, which can similarly include components of motive system 100 shown in FIG. 1 and may enable railway vehicle 502 to operate autonomously and without locomotives. Similar to the examples shown in FIG. 3 and FIG. 4, motive system 500 can include components that can enhance performance of railway vehicle 502.

In the example embodiment, railway vehicle 502 has a flat design to enable one or multiple containers (e.g., shipping container 504) to be positioned on top. Motive system 500 implemented on railway vehicle 502 includes front component 506 positioned at front side 510 and rear component 508 positioned at rear side 512. One or both of front component 506 and rear component 508 can include various components of motive system 500, such as sensors, energy storage (e.g., batteries), etc. In addition, the bogies of railway vehicle 502 can similarly include components of motive system 500, such as regenerative brakes, motors, etc. Motive system 500 can also be designed for standard coupling interfaces and may use one or multiple bearing adapters disclosed herein.

In addition, each railway vehicle 302, 402, 502 can further include additional components, such as emergency brakes, lights, and horns.

III. Example Train Recorder Devices and Techniques

Figure 6:
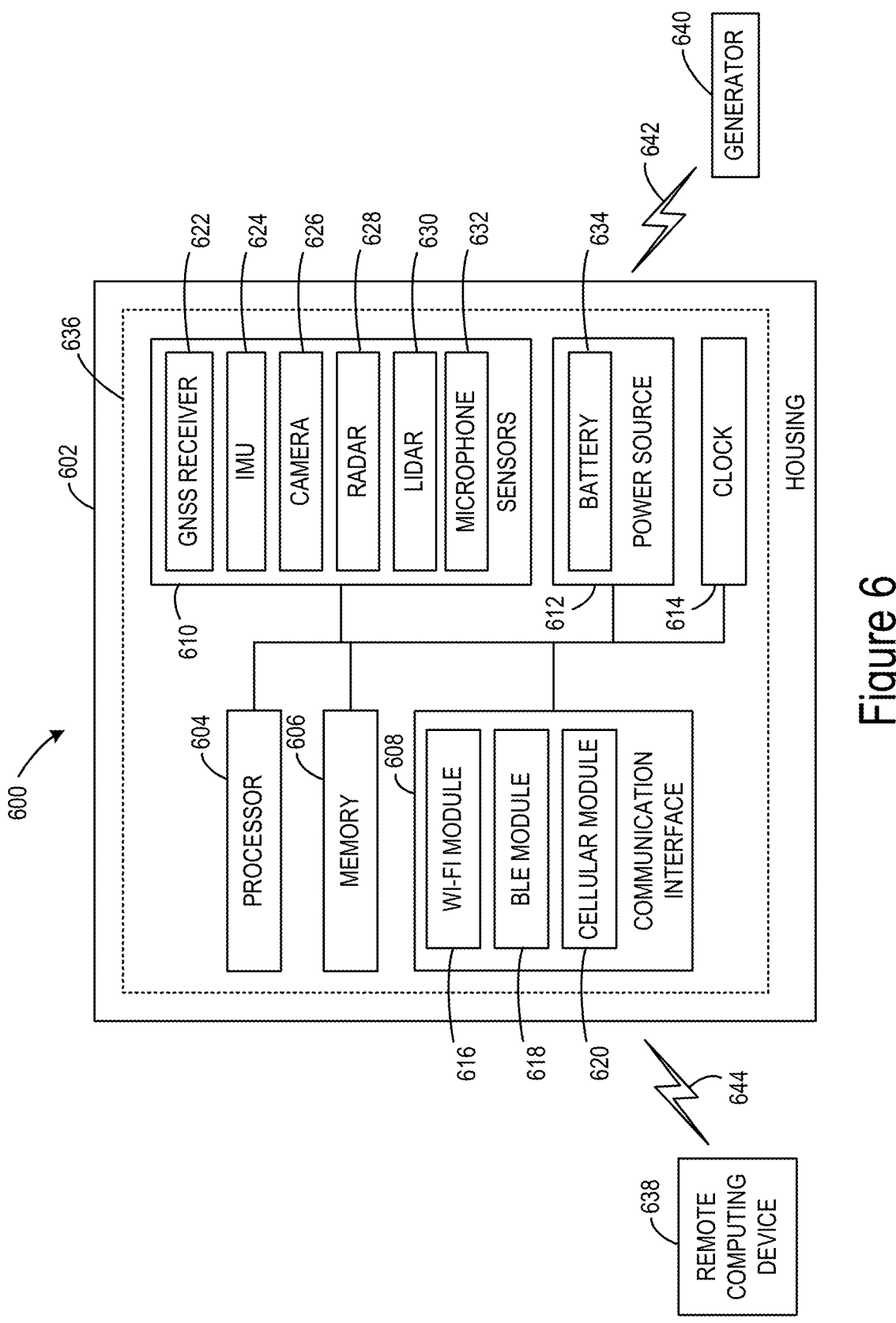
FIG. 6 is a functional block diagram illustrating a train recorder and event notification device in a housing, according to one or more example embodiments.

FIG. 6 is a functional block diagram of device 600, which represents an example train data recorder and event notification system. As shown in FIG. 6, device 600 includes housing 602 that serves to organize and protect components, such as processor 604, memory 606, communication interface 608, sensors 610, power source 612, and clock 614. The configuration of device 600 and corresponding components shown in FIG. 6 represents one possible example. In other examples, device 600 can include more or fewer components, which can be arranged in different configurations. In some cases, components of device 600 can be supplemented by externally placed components, such as additional sensors.

Device 600 represents an example data recorder and notification system, which can be positioned onboard a train or near a railway to detect and record events as well as other information. When placed upon a train, device 600 can record a wide range of travel data parameters, including train-specific parameters and environment parameters. For instance, device 600 can be positioned on railway vehicle 302 shown in FIG. 3, railway vehicle 402 shown in FIG. 4, or railway vehicle 502 shown in FIG. 5.

Train-specific parameters can include data related to various aspects, such as speed, orientation, acceleration (3 axes), wheel speeds, vibration data, shock data, motor temperature, drivetrain temperatures, temperatures of enclosures, CAN Bus data (and other interfaces), camera/video data, radar/lidar data, etc. Some environment parameters can relate to tracks, train signals, areas near the tracks, etc. Enclosure temperatures can be monitored and may include processors, high voltage enclosures, battery enclosures, and motor/drivetrain enclosures. In some examples, train-specific parameters can specify when brakes were initiated and applied, when motor or motors were commanded forward or reverse, and other types of sensor data (e.g., radar and lidar data).

In some examples, device 600 and similar devices can be positioned on different train cars within the same train set and communicate with each other devices. As such, the use of multiple devices can enable more data to be aggregated from different points of the train set. Similarly, data can be aggregated from devices positioned on various trains by a central computing system and used for various purposes, such as generating global train track maps and determining trends among data generated based on the performance of different trains. Such techniques can allow comparison between trains operating in different environments and along different routes.

Housing 602 of device 600 represents the outer casing that surrounds and protects internal electronic components. In general, housing 602 serves several critical functions, including providing physical protection to the delicate and sensitive electronic components within device 600. Housing 602 shields components from environmental factors, such as dust, moisture and weather conditions (e.g., rain and snow), humidity, salt, dirt, and physical impacts that can be encountered when device 600 is positioned on a train. Housing 602 can also act as a barrier to prevent electromagnetic interference (EMI) from external sources that could disrupt the proper operation of device 600. In addition, housing 602 can include features, such as heat sinks, ventilation, and/or cooling systems to dissipate heat generated by the various components during operation of device 600. The features can help maintain the optimal temperature of internal components, preventing overheating and potential damage.

The materials, size, and configuration of housing 602 can differ within examples. Housing 602 of device 600 can be made from a wide range of materials, with each material chosen based on factors like functions of device 600, durability requirements, aesthetics, and manufacturing processes. In some cases, housing 602 is made out of plastics, which offer versatility, cost-effectiveness, and ease of manufacturing. Common plastic materials include ABS, polycarbonate, polypropylene, and acrylic. The plastics can be molded into various shapes and are suitable for both injection molding and three-dimensional (3D) printing. Alternatively, housing 602 can be made out of one or more metals, like aluminum, stainless steel, and magnesium that offer durability and strength. Metal housings provide robust protection for internal components of device 600 and can be machined or die-cast into the desired shape. Other materials can be used for forming at least portions of housing 602, such as ceramics, composite materials, rubber and silicon, and glass. For instance, composite materials can be used to create housing 602 to have a blend of strength and light-weight properties. Rubber and silicone can be used for shock and vibration absorption as well as waterproofing.

Various techniques can be used to form housing 602. For instance, housing 602 can be made via injection molding, which involves injecting molten material into a mold cavity and waiting for the material to cool and solidify into the desired shape of the mold. Computer Numerical Control (CNC) machining can be used to precisely generate housing 602 using metal or plastic. CNC machining involves cutting away material from a solid block to create the desired shape for housing 602. Die-casting is another technique that can be used to form housing 602, which involves injecting molten metal into a mold cavity under high pressure and then allowing it to cool to form housing 602. In some embodiments, 3D printing, or additive manufacturing, is used to build housing 602 layer by layer from a digital 3D model that enables complex shapes and customization. Other techniques can be used to form housing 602 (or portions of housing 602), including vacuum forming, compression molding, and extrusion. The choice of material and manufacturing techniques used to generate housing 602 can depend on factors like production volume, cost constraints, design complexity, and material properties.

Housing 602 can also include various openings or interfaces, such as ports for connecting external peripherals or displays. For instance, housing 602 can include one or more openings that align with sensors, such as an opening that allows the lens of camera 626 to extend through housing 602.

In some examples, housing 602 also includes one or more layers 636. For instance, layers 636 can include a heat-resistant insulation layer, which can be positioned around one or more sensors and/or other components within device 600. In some cases, the heat-resistant insulation layer includes a second opening positioned proximate to the opening in the housing such that the lens of the camera (or other sensors) also extends through the heat-resistant insulation layer. Layers 636 can include a shock absorption layer, which can be positioned around one or more sensors, the memory, and/or other components of device 600. The shock absorption layer reduces external forces on the one or more sensors of the plurality of sensors and the memory.

Processor 604 may be one or more of any type of computer processing element, such as a central processing unit (CPU), a co-processor (e.g., a graphics processor), a digital signal processor (DSP), a network processor, and/or a form of integrated circuit or controller that performs processor operations. As such, processor 604 may be one or more single-core processors and/or one or more multi-core processors with multiple independent processing units. In addition, processor 604 may also include register memory for temporarily storing instructions being executed and related data, as well as cache memory for temporarily storing recently-used instructions and data.

Memory 606 refers to a storage component of device 600 where data and instructions are temporarily or permanently stored for processing. As such, memory 606 may be any form of computer-usable memory, including but not limited to random access memory (RAM), read-only memory (ROM), and non-volatile memory. This may include flash memory, hard disk drives, solid state drives, rewritable compact discs (CDs), rewritable digital video discs (DVDs), and/or tape storage, as just a few examples. Device 600 may include fixed memory as well as one or more removable memory units, the latter including but not limited to various types of secure digital (SD) cards. As an example result, memory 606 can represent both main memory units as well as long-term storage. In addition, memory 606 may store program instructions and/or data on which program instructions may operate. By way of example, memory 606 may store these program instructions on a non-transitory, computer-readable medium, such that the instructions are executable by processor 604 to perform any of the methods, processes, or operations disclosed in this specification or the accompanying drawings.

Memory 606 can be used to store sensor data obtained from sensors 610 to ensure that the data can be recorded, processed, and retrieved. Sensors 610 collect data based on the physical, chemical, or environmental parameters that they are designed to monitor. The raw data collected by sensors 610 can be converted into a digital form using an analog-to-digital converter (ADC). This process quantizes the analog signals provided by sensors 610 into discrete digital values that can be processed and stored in memory 606. In some cases, sensor data may be temporarily stored in a buffer or temporary memory within device 600 before being permanently stored. In particular, buffering can help manage the flow of data and prevent data from being lost if there are delays in processing or storage. Converted sensor data can be stored in permanent memory storage, such as flash memory, solid-state drives (SSDs), or other storage media.

In some examples, stored sensor data is organized in a structured format, such as databases, files, or records, which makes it easier to retrieve and process. Each data point can be associated with metadata, such as a timestamp indicating when the measurement was taken and sensor identification. The stored sensor data can also be tagged or indexed with additional information, such as location coordinates, device identifiers, or event markers, which can help in searching, filtering, and categorizing the data. Device 600 can utilize data management techniques to handle large datasets as the sensor data acquired increases over time. For instance, device 600 can use data compression, archiving, and data purging to remove less relevant data (when needed). In addition, communication interface 608 can be used to transmit data to a remote server. Device 600 or external systems can retrieve stored sensor data for various uses, such as real-time monitoring, analysis, reporting, or sharing with other systems. In addition, device 600 can use encryption and access control to protect sensitive sensor data and prevent unauthorized users or devices from accessing or modifying the stored data.

Communication interface 608 represents a set of protocols, hardware components, and software that enables device 600 to exchange data or information with other devices or systems, such as remote computing device 638. In general, communication interface 608 provides the pathway through which data can be transmitted and received. Communication interface 608 allows device 600 to send and receive data, commands, or information over a network, such as the Internet. In some cases, communication interface 608 can be used to report specific events or triggers, such as a sudden deceleration indicative of a collision or hard braking, changes in train orientation indicative of a rollover, or other predefined conditions. When an event is detected, device 600 may be configured to record data at a higher resolution in order to capture more detailed information about the event.

As shown in FIG. 6, communication interface 608 can include Wi-Fi module 616, BLE module 618, and cellular module 620, which can be used to communicate with other devices, such as remote computing device 638. Wi-Fi module 616 enables wireless communication within devices and systems by integrating hardware and software to connect to Wi-Fi networks, facilitating data transmission and internet access. Similarly, BLE module 618 represents an energy-efficient electronic component specifically designed for wireless communication and enables low-power, short-range wireless connectivity. BLE module 618 enables wireless connectivity while conserving power resources. For instance, BLE module 618 can be used to communicate with external devices located within a threshold distance from device 600. In some cases, BLE module 618 is used to communicate information to a remote computing device (e.g., remote computing device 638), which can be positioned onboard the train. Cellular module 620 can enable device 600 to connect to one or multiple cellular networks during operations. For instance, cellular module 620 can include a transmitter and a receiver, which enables device 600 to communicate sensor data using cellular module 620 connected to a cellular network. Communication interface 608 can include other types of communication modules within examples, such as radio frequency identification (RFID).

Sensors 610 are components that can detect and respond to physical, chemical, electrical, or environmental stimuli and convert this information into electrical signals or data that can be processed, analyzed, stored, and/or used by device 600 or another system (e.g., remote computing device 638). Device 600 can include one or multiple sensors to measure aspects of the surrounding environment and/or movement parameters of the train upon which device 600 is positioned upon. In the example embodiment shown in FIG. 6, sensors 610 includes a Global Navigation Satellite System (GNSS) receiver 622, inertial measurement unit (IMU) 624, camera 626, radar 628, lidar 630, and microphone 632. In some cases, sensors 610 can include more or fewer sensors. For instance, device 600 can include other types of sensors, such as temperature sensors, pressure sensors, humidity sensors, gas sensors, and/or force sensors.

GNSS receiver 622 represents equipment that operates by leveraging signals transmitted from a network of orbiting satellites to determine the precise geographic location of device 600 on Earth's surface. Location determination involves GNSS receiver 622 listening for signals from multiple satellites, such as signals provided by the Global Positioning System (GPS). The satellite signals contain information about the satellite's position, precise timing, and other parameters. Once GNSS receiver 622 receives signals from at least four satellites simultaneously, GNSS receiver 622 can perform trilateration to calculate the three-dimensional (3D) position of device 600, which can be represented by latitude, longitude, and altitude coordinates.

IMU 624 represents components that can be used to measure and report the orientation, acceleration, and angular velocity of device 600 with respect to a known starting point (e.g., Earth's frame of reference). IMU 624 can include multiple components, such as accelerometers, gyroscopes, and/or magnetometers. Accelerometers can be used to measure acceleration along three axes (e.g., X, Y, and Z) and can detect changes in velocity, including both linear acceleration (changes in speed) and gravitational acceleration. IMU 624 is able to integrate acceleration data over time to determine the velocity and position of device 600. IMU 624 can also include one or multiple gyroscopes that measure angular velocity, which can be used to measure how quickly device 600 is rotating around each of the three axes. Gyroscopes can provide information about the rate of change of orientation. In some cases, IMU 624 may include one or more magnetometers, which can measure the strength and direction of the Earth's magnetic field. This information can be used by device 600 for a magnetic compass-like capability.

During operation, IMU 624 collects data from its accelerometers, gyroscopes, and magnetometers (if included). To determine the orientation of device 600, IMU 624 can use a sensor fusion algorithm to combine the data to calculate the orientation in 3D space. IMU 624 outputs the orientation, acceleration, and angular velocity to other components of device 600, which can associate this data with other sensor measurements for subsequent processing and storage in memory 606. In some examples, IMU 624 generates data that is stored along with position data from GNSS receiver 622 as well as other sensor measurements as the train travels a route.

Camera 626 represents an optical device that can be used to capture images of the external environment. The types and quantity of cameras can differ within examples. For instance, camera 626 can include stereo cameras that can provide depth measurements in some examples. When capturing an image, light from the external environment enters camera 626 through the lens. The lens focuses this incoming light onto the image sensor of camera 626, which is composed of millions of tiny light-sensitive elements called pixels. Each pixel records the intensity of light it receives at a specific point in the scene and, by recording the light intensity at various points across the image sensor, camera 626 is able to effectively create a digital representation of the scene. The resulting image can be stored or processed. In some cases, camera 626 can include one or multiple advanced features, such as auto-focus, exposure control, and image processing algorithms to enhance the quality and usability of captured images. These features can enable camera 626 to capture a wide range of visual information from the external environment.

Radar 628 is part of device 600 that can use radio waves to detect and locate objects in the surrounding environment. In general, radar 628 works by emitting electromagnetic waves and then measuring the time it takes for these waves to bounce off objects (and other surfaces in the environment) and return to radar 628. By analyzing the time delay and the characteristics of the returning signals, radar 628 can be used to determine the distance, speed, direction, and sometimes even the size and shape of objects. Radar 628 can also be used to measure the relative speed of other objects by analyzing the Doppler shift in the reflected signals.

Lidar 630 is another sensor, which uses laser light to measure distances and create detailed 3D maps of the environment. In general, lidar 630 operates by emitting laser pulses and measuring the time it takes for those pulses to bounce back after striking objects or surfaces in the environment. This time-of-flight data allows lidar 630 to be used to calculate the distance to various points in the scene accurately. By scanning the laser beam across different angles and positions, lidar 630 can generate a dense point cloud that represents the topography, shape, and location of objects in its field of view. The 3D point clouds can be used for various applications, such as mapping, surveying, autonomous navigation, and environmental monitoring.

Microphone 632 can be used to convert sound waves into electrical signals. Device 600 can use microphone 632 to capture audio or sound information in a variety of applications, including recording and communication. As such, device 600 can include one or multiple microphones 632. In some examples, device 600 may use multiple microphones to localize the source of a sound relative to device 600.

Power source 612 is a component or system that provides the necessary electrical energy to operate device 600. Power source 612 supplies the voltage and current required to power the various components operating as part of device 600. As shown in FIG. 6, power source 612 can include battery 634, which represents one or more batteries that can be positioned within housing 602 or connected to device 600. The batteries can provide power to sensors 610 and other components of device 600 (e.g., processor 604 and memory 606). Batteries are portable, self-contained power sources that store chemical energy and convert it into electrical energy when needed by device 600. The type, chemistry, and size of the batteries can differ within examples. Power source 612 can include other components, such as power adapter (AC/DC adapters).

Generator 640 is shown communicating via communication connection 642 with power source 612 and represents one or multiple devices that can supply electrical energy to battery 634. For instance, generator 640 can be connected to railway vehicle power sources or another power generation source. As such, generator 640 can be positioned external to housing 602 and can be configured to recharge battery 634. In some examples, solar panels, wind power, or other power generation sources can operate as part of generator 640 and be used to power battery 634.

Clock 614 can be used by device 600 to record and store time-stamped data related to operations of the train. Device 600 can use clock 614 to timestamp sensor measurements to accurately record the time at which an event or measurement occurred. Device 600 uses clock 614 to generate a continuous stream of accurate time values (e.g., timestamps), which are synchronized to a global time standard (e.g., Coordinated Universal Time (UTC)) with a very low margin of error. One or multiple sensors of device 600 generates measurements that are recorded with a timestamp from clock 614 to represent the exact time when the measurement was taken. In some applications, GPS coordinates from GNSS receiver 622 are added to the timestamped measurement. These coordinates can be combined with the measurement timestamp to create a comprehensive data record that includes both time and location of device 600. In some cases, data output by IMU 624 are also included as part of the measurement timestamp to further enhance the data record. As such, the timestamped sensor measurements, along with any additional information (e.g., GPS coordinates and IMU data) can be stored in a data log in memory 606 and/or transmitted to a database (e.g., remote computing device 638 via communication connection 644) for further analysis, visualization, or archival purposes. Processor 604 can receive time data from clock 614 that is temporally associated with the sensor data and to store the time data from clock 614 and the sensor data on memory 606 as structured data. Device 600 can periodically synchronize clock 614 with external time references, such as network time servers or GPS signals. Calibration procedures can be used to account for clock drift or systematic errors in sensor measurements.

In some examples, device 600 stores audio data from microphone 632 and stores the audio data, images from camera 626, measurements from IMU 624 based on position data for the train as the train navigates along a rail. Similarly, device 600 can associate other types of sensor data with other measurements when storing the data. In some cases, processor 604 can detect that an anomalous event has occurred based on sensor data from one or more sensors 610. Processor 604 can use communication interface 608 to provide an alert to a remote computing system (e.g. remote computing device 638). The alert can include various data, such as one or more images from camera 626, and a position of device 600 based on data from GNSS receiver 622.

In some examples, one or more sensors 610, memory 606, and processor 604 are configured to switch from a low power mode to a high power mode responsive to IMU 624 measuring an impulse above a threshold impulse value. This technique can enable device 600 to preserve battery power during periods when the train is stationary.

In some examples, processor 604 can receive sensor data as the train navigates a route along a track and map at least images received from camera 626 to respective portions of the track of a track map based on position data from GNSS receiver 622. Processor 604 can also receive speed and orientation data from IMU 624 as the train navigates the route along the track and associate the speed and orientation data from IMU 624 to the respective portions of the track.

In some examples, device 600 uses radar for sensing and localization of obstacles, track deformations, and other aspects of the environment. Device 600 can also communicate with wheel speed sensors for localization based on speed and distance traveled. Device 600 may also communicate with one or more thermistors for temperature monitoring, such as in the railonic bays or other positions of the train to detect when batteries, processors, high voltage connections, drive train, motor, or other components are outside a desired temperature range (e.g., overheated). In some cases, device 600 can communicate with (or include) one or more hygrometers for humidity measurements, one or more pressure transducers for measuring the pressure of the air braking system, and/or obtain data from the battery management system located the railway vehicle.

Figure 7:
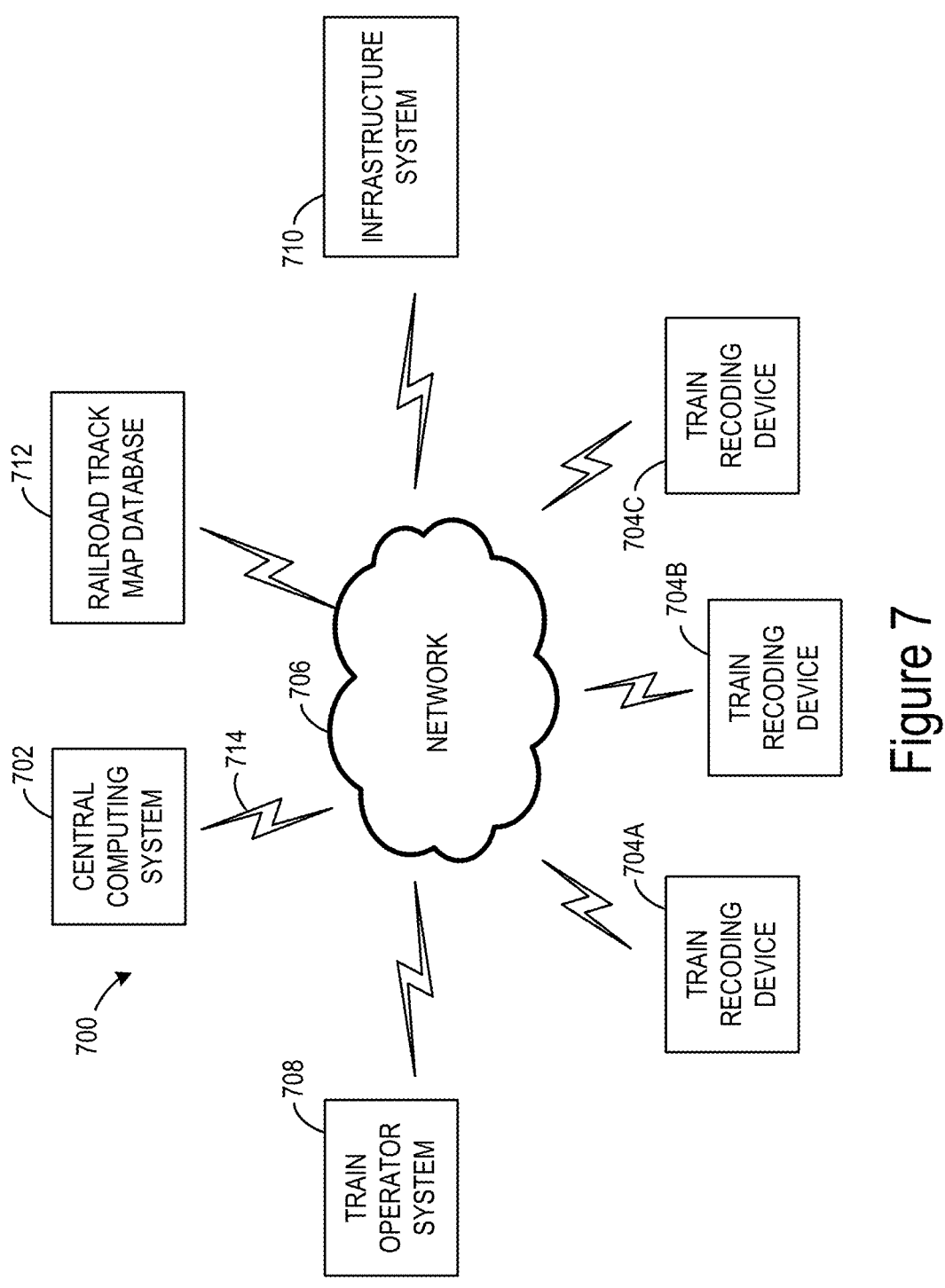
FIG. 7 is a functional block diagram illustrating a system and network for aggregating and leveraging location-based data generated by train recording devices, according to one or more example embodiments.

FIG. 7 is a diagram illustrating a system for aggregating and leveraging location-based data generated by train recording devices. In the example embodiment, system 700 involves network 706 facilitating communication between central computing system 702, train recording device 704A, train recording device 704B, train recording device 704C, train operator system 708, infrastructure system 710, and railroad track map database 712, which are all shown communicating via wireless communication 714. In some cases, one or more participants in system 700 may communicate via wired connections. System 700 is illustrated as simplified example and can include additional participants, such as additional train recording devices, servers, computers, etc.

Central computing system 702 can represent one or multiple computing systems that can perform techniques disclosed herein. Similarly, train recording devices 704A-704C are also computing devices, but are configured to be positioned onboard trains. In some examples, train recording devices 704A-704C are implemented as device 600 shown in FIG. 6. Network 706 represents infrastructure that enables wired and wireless communication between central computing system 702, train recording device 704A, train recording device 704B, train recording device 704C, train operator system 708, and infrastructure system 710, and railroad track map database 712.

Train operator system 708 represents technologies, systems, computing devices, and controls used by train operators and railway companies to manage and operate trains. In general, train operator system 708 can include train control systems, signaling and communication subsystems, scheduling and traffic management subsystems, maintenance and monitoring subsystems, and other subsystems used to enable train operators across a network of railroad tracks.

Infrastructure system 710 represents the physical components and structures that make up the railway network and support the operation of trains. As such, infrastructure system 710 can enable the movement of trains, ensure safety, and maintain the tracks and associated infrastructure. As such, infrastructure system 710 can include interfaces and control systems that can be automatically adjusted based on information provided by central computing system 702 or other devices. In some cases, infrastructure system 710 can include interfaces that enable technicians or operators to perform actions based on information provided by system 700.

Railroad track map database 712 represents a collection of structured data that stores detailed information about the layout, configuration, and characteristics of railroad tracks within a railway network. Additional databases can be included within system 700, such as weather databases and train route scheduling databases, among others.

To securely aggregate data from train recording devices 704A-704C, central computing system 702 can employ several techniques to ensure data integrity, confidentiality, and authentication. For instance, central computing system 702 and train recording devices 704A-704C can use end-to-end encryption (e.g., SSL/TLS (Secure Sockets Layer/Transport Layer Security) protocols) to ensure that data transmitted between train recording devices 704A-704C and central computing system 702 is encrypted. Encryption secures the data in transit between devices, making it unreadable to any unauthorized parties intercepting the communication.

In some examples, train recording devices 704A-704C are authenticated before data can be shared among them and with other devices (E.g., central computing system 702). Techniques like password-based authentication, two-factor authentication, digital certificates or automated handshakes can ensure that only authorized devices can access and send data to central computing system 702. In some implementations, hashing algorithms can be used to verify data integrity. By creating a cryptographic hash of the data at the source and then verifying it at central computing system 702, any alterations to the data during transmission can be detected. In addition, participants within system 700 can implement secure communication protocols, firewalls, and VPNs (Virtual Private Networks) that may help in establishing secure channels for data transmission, preventing unauthorized access or data breaches. In some cases, central computing system 702 may use role-based access control, which prevents unauthorized systems or personnel from having access to specific data or functionalities within system 700.

Central computing system 702 can use the collected information to assist train operator system 708 and infrastructure system 710. For instance, central computing system 702 can analyze the aggregated data to identify patterns, trends, and anomalies in the behavior of trains. Central computing system 702 can determine information that can be used to optimize performance, identify inefficiencies, and suggest improvements. Similarly, by analyzing data patterns, central computing system 702 can predict potential issues or failures in trains that have one or more train recording devices 704A-704C located thereon. In some cases, predictive analysis enables proactive maintenance scheduling, reducing downtime and improving device performance.

Central computing system 702 can significantly enhance the performance of trains within a network of railroad tracks and provide various benefits to companies utilizing trains for shipping goods, materials, or moving passengers in various ways. For instance, central computing system 702 can analyze real-time and historical data to optimize train routes and schedules, which can reduce travel time, improve efficiency, and ensure on-time delivery. By monitoring data describing the performance of trains and surrounding track infrastructure encountered during travel, central computing system 702 can predict maintenance needs that proactively reduces the likelihood of unexpected breakdowns and minimizes downtime. In some cases, central computing system 702 may analyze train operations to optimize factors like acceleration, deceleration, and speed profiles, which can lead to more energy-efficient operations that reduce costs and environmental impact. Continuous monitoring of trains enables central computing system 702 to oversee safety, track positions, and regulate operations in real time, which ensures adherence to safety protocols and standards. In some examples, central computing system 702 can provide information that enables adjusting train operation parameters dynamically based on traffic, weather, and track conditions can enhance safety and efficiency.

Central computing system 702 can use information from train recording devices 704A-704C to improve logistics and predictability. Efficient train operations facilitated by central computing system 702 can ensure more reliable and predictable transportation schedules, which can assist companies in planning their supply chain and inventory management more effectively. Similarly, techniques performed by system 700 can also lead to reduced costs and enhanced efficiency. System 700 can help optimize train performance producing lower transportation costs, reduced transit times, and improved supply chain efficiency. This can benefit companies, reduce costs, and streamline operations.

System 700 also enables real-time tracking and transparency when trains are traveling routes. Central computing system 702 enables real-time monitoring capabilities, which provide tracking and visibility into the movement of goods. As an example result, companies gain a better insight into shipment status. In addition, system 700 also enables insights into transportation patterns, potential delays, and performance metrics.

Figure 8:
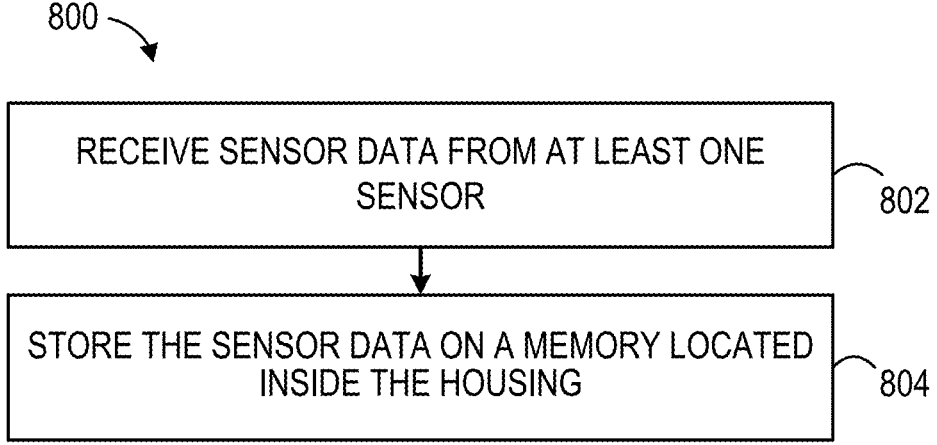
FIG. 8 is a flowchart of a method for using a train recording and event notification device, according to one or more example embodiments.

FIG. 8 is a flowchart of a method for recording events using a train recording device. Method 800 represents an example method that may include one or more operations, functions, or actions, as depicted by one or more of blocks 802 and 804, each of which may be carried out by any of the systems, devices, and/or vehicles shown in FIGS. 1-7, among other possible systems.

Those skilled in the art will understand that the flowcharts described herein illustrate functionality and operations of certain implementations of the present disclosure. In this regard, each block of the various flowcharts may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as may be understood by those reasonably skilled in the art.

At block 802, method 800 involves receiving sensor data from at least one sensor. The sensors are located within a housing that is removably attached to a train and include a GNSS receiver, an IMU, and a camera. A lens of the camera is positioned relative to an opening in the housing such that the camera can capture images of an environment located outside the housing.

At block 804, method 800 involves storing the sensor data on a memory located inside the housing. For instance, the device can store an image (or multiple images) with reference data in the memory. The reference data includes location data from the GNSS receiver and orientation data from the IMU.

In some examples, method 800 involves detecting, based on the sensor data, an event. The device can then transmit, based on detecting the event, an event notification to a remote computing system.

FIG. 9 is a flowchart of a method for generating location-based data while a train travels a route. Method 900 represents an example method that may include one or more operations, functions, or actions, as depicted by one or more of blocks 902, 904, 906, 908, and 910, each of which may be carried out by any of the systems, devices, and/or vehicles shown in FIGS. 1-7, among other possible systems.

At block 902, method 900 involves obtaining, at a computing system attached to a train, a railroad map that represents a network of railroad tracks.

At block 904, method 900 involves receiving, at the computing system, location data from a Global Navigation Satellite System (GNSS) receiver and motion data from an inertial measurement unit (IMU) as the train travels a route on one or more railroad tracks of the network of railroad tracks.

At block 906, method 900 involves monitoring a position of the train along the one or more railroad tracks based on the railroad map and location data.

At block 908, method 900 involves generating location-based data that associates the motion data with portions of the one or more railroad tracks.

At block 910, method 900 involves storing the location-based data in memory.

In some examples, method 900 further involves receiving multiple images from a camera as the train travels the route on the one or more railroad tracks. The computing system may then generate the location-based data to further associate images with portions of the one or more railroad tracks. The computing system may associate each image with a given portion of railroad track based on a location of the train when the camera captured the image. In some cases, the GNSS receiver, the IMU, and the camera are located within a housing. The housing is removably attached to an exterior of the train and a lens of the camera is positioned relative to an opening in the housing such that the camera can capture images of an environment located outside the housing.

In some instances, the computing system may detect an issue with a portion of railroad track or corresponding infrastructure based on the images received from the camera. The computing system may then store information representing the issue with the portion of railroad track with location-based data representing the portion of railroad track or corresponding infrastructure. In some cases, the computing system may also provide a notification to a remote computing system that conveys the issue. For instance, the computing system may detect an issue with a railroad signal positioned proximate to the portion of railroad track and provide the notification to a remote computing system reporting the railroad signal issue. In addition, the computing system may also provide the location-based data to a remote computing system. The remote computing system can generate a representation that maps the images to one or more portions of the railroad tracks based on the railroad map depicting the railroad tracks.

In some examples, method 900 involves providing the location-based data to a remote computing system. The remote computing system is configured to aggregate location-based data from multiple computing systems attached to multiple trains. Method 800 can then further involve receiving route instructions from the remote computing system. The remote computing system is configured to determine route instructions based on the aggregated location-based data from the various computing systems.

In some examples, method 900 further involves monitoring the motion data received from the IMU as the train travels the route relative to one or more predefined thresholds. In some instances, the computing system may detect a portion of the motion data that exceeds at least one predefined threshold from the one or more predefined threshold. The computing system may then provide an alert to a remote computing system based on detecting the portion of the motion data that exceeds at least one predefined threshold. The alert can specify at least a location of the train associated with the portion of the motion data. In some embodiments, the computing system may also receive sensor data representing an environment of the train from one or more sensors (e.g., a camera) and provide a portion of the sensor data corresponding to the location of the train associated with the portion of motion data (e.g., images from the camera) to the remote computing system. In some cases, the computing system may also adjust one or more predefined thresholds based on the portion of the sensor data.

In some examples, method 900 involves receiving first sensor data from a first sensor and second sensor data from a second sensor as the train travels the route on the one or more railroad tracks. For instance, the first sensor data and the second sensor data can be received in addition to the location data and motion data. Method 900 can also involve performing a sensor fusion process to combine the first sensor data and the second sensor data to generate output data. The output data can represent respective states of the train as the train travels the route on the one or more railroad tracks. The GNSS receiver, the IMU, the first sensor, and the second sensor are located within a housing that is removably attached to an exterior of the train. In some examples, the first sensor is a first camera and the second sensor is a second camera.

Figure 10:
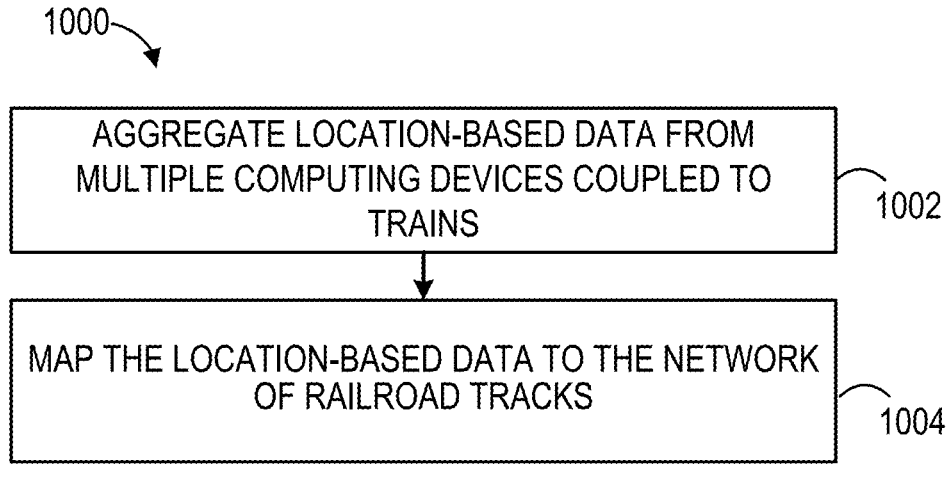
FIG. 10 is a flowchart of a method for managing location-based data from multiple computing devices coupled to trains, according to one or more example embodiments.

FIG. 10 is a flowchart of a method for managing location-based data received from multiple computing systems. Method 1000 represents an example method that may include one or more operations, functions, or actions, as depicted by one or more of blocks 802, 804, 806, 808, and 810, each of which may be carried out by any of the systems, devices, and/or vehicles shown in FIGS. 1-6, among other possible systems.

At block 1002, method 1000 involves aggregating location-based data from a plurality of computing devices coupled to a plurality of trains. In some examples, each computing device includes a GNSS receiver configured to provide location data and an IMU configured to provide movement data. The first computing device is attached to a first train and provides first location-based data based on first location data and first movement data obtained as the first train travels a first route on one or more railroad tracks of a network of railroad tracks and a second computing device is attached to a second train and provides second location-based data based on second location data and second movement data obtained as the second train travels a second route on one or more railroad tracks of the network of railroad tracks.

At block 1004, method 1000 involves mapping the location-based data to the network of railroad tracks.

In some examples, method 1000 involves detecting a trend corresponding to a portion of a railroad track of the network of railroad tracks and receiving a route from a third computing device attached to a third train where the route includes the portion of the railroad track. The computing system may then provide, based on the trend, operation instructions to the third train for use during travel on at least that portion of the railroad track.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:

obtaining, at a computing system attached to a train, a railroad map that represents a network of railroad tracks;

receiving, at the computing system, location data from a Global Navigation Satellite System (GNSS) receiver and motion data from an inertial measurement unit (IMU) as the train travels a route on one or more railroad tracks of the network of railroad tracks;

monitoring a position of the train along the one or more railroad tracks based on the railroad map and location data;

generating condition-monitoring data that associates the motion data comprising vibration or acceleration data indicative of track integrity with specific locations along the one or more railroad tracks to create a detailed profile of track health and performance for predictive maintenance; and storing the condition-monitoring data in memory.

2. The method of claim 1, further comprising:

receiving a plurality of images from a camera as the train travels the route on the one or more railroad tracks; and wherein generating condition-monitoring data that associates the motion data with specific locations along the one or more railroad tracks comprises:

generating the condition-monitoring data to further associate images with specific locations along the one or more railroad tracks, wherein each image is associated with a specific location of railroad track based on a location of the train when the camera captured the image.

3. The method of claim 2, wherein the GNSS receiver, the IMU, and the camera are located within a housing, wherein the housing is removably attached to an exterior of the train, and wherein a lens of the camera is positioned relative to an opening in the housing such that the camera can capture images of an environment located outside the housing.

4. The method of claim 2, further comprising:

based on the plurality of images, detecting an issue with a portion of railroad track or corresponding infrastructure; and storing information representing the issue with the portion of railroad track using the condition-monitoring data representing that portion of railroad track or corresponding infrastructure.

5. The method of claim 4, further comprising:

based on detecting the issue with the portion of railroad track or corresponding infrastructure, providing a notification to a remote computing system that conveys the issue.

6. The method of claim 4, wherein detecting the issue with the portion of railroad track or corresponding infrastructure comprises:

detecting the issue with a railroad signal positioned proximate to the portion of railroad track.

7. The method of claim 4, further comprising:

providing the condition-monitoring data to a remote computing system, wherein the remote computing system is configured to generate a representation that maps the images to specific locations of the railroad tracks based on the railroad map.

8. The method of claim 1, further comprising:

providing the condition-monitoring data to a remote computing system, wherein the remote computing system is configured to aggregate condition-monitoring data from a plurality of computing systems attached to a plurality of trains.

9. The method of claim 8, further comprising:

receiving route instructions from the remote computing system, wherein the remote computing system is configured to determine route instructions based on the aggregated condition-monitoring data from the plurality of computing systems.

10. The method of claim 1, further comprising:

monitoring the motion data received from the IMU as the train travels the route relative to one or more predefined thresholds;

detecting a portion of the motion data that exceeds at least one predefined threshold from the one or more predefined threshold; and providing an alert to a remote computing system based on detecting the portion of the motion data that exceeds at least one predefined threshold, wherein the alert specifies at least a location of the train associated with the portion of the motion data.

11. The method of claim 10, further comprising:

receiving sensor data representing an environment of the train from one or more sensors, wherein the one or more sensors includes a camera; and wherein providing the alert to the remote computing system further comprising:

providing a portion of the sensor data corresponding to the location of the train associated with the portion of motion data.

12. The method of claim 11, further comprising:

based on the portion of the sensor data, adjusting the at least one predefined threshold.

13. The method of claim 1, further comprising:

receiving first sensor data from a first sensor and second sensor data from a second sensor as the train travels the route on the one or more railroad tracks, wherein the first sensor data and the second sensor data is received in addition to the location data and motion data; and performing a sensor fusion process to combine the first sensor data and the second sensor data to generate output data.

14. The method of claim 13, wherein the output data represents respective states of the train as the train travels the route on the one or more railroad tracks.

15. The method of claim 13, wherein the output data represents changes in an environment of the train as the train travels the route on the one or more railroad tracks.

16. The method of claim 13, wherein the GNSS receiver, the IMU, the first sensor, and the second sensor are located within a housing, and wherein the housing is removably attached to an exterior of the train.

17. The method of claim 16, wherein the first sensor is a first camera and the second sensor is a second camera.

18. A non-transitory computer-readable medium configured to store instructions, that when executed by a computing system comprising one or more processors, causes the computing system to perform operations comprising:

obtaining a railroad map that represents a network of railroad tracks;

receiving location data from a Global Navigation Satellite System (GNSS) receiver and motion data from an inertial measurement unit (IMU) as a train travels a route on one or more railroad tracks of the network of railroad tracks;

monitoring a position of the train along the one or more railroad tracks based on the railroad map and location data;

generating condition-monitoring data that associates the motion data comprising vibration or acceleration data indicative of track integrity with specific locations along the one or more railroad tracks to create a detailed profile of track health and performance for predictive maintenance; and storing the condition-monitoring data in memory.

19. A method comprising:

aggregating location-based data from a plurality of computing devices coupled to a plurality of trains, wherein each computing device includes a Global Navigation Satellite System (GNSS) receiver configured to provide location data and an inertial measurement unit (IMU) configured to provide motion data comprising vibration or acceleration data indicative of track integrity, wherein a first computing device is attached to a first train and provides first condition-monitoring data based on first location data and first motion data obtained as the first train travels a first route on one or more railroad tracks of a network of railroad tracks and a second computing device is attached to a second train and provides second condition-monitoring data based on second location data and second motion data obtained as the second train travels a second route on one or more railroad tracks of the network of railroad tracks, and wherein the first condition-monitoring data associates the first motion data with specific locations along the one or more railroad tracks and the second condition-monitoring data associates the second motion data with specific locations along the one or more railroad tracks; and mapping the first condition-monitoring data and the second condition-monitoring data to the network of railroad tracks to create a detailed profile of track health and performance for predictive maintenance.

20. The method of claim 19, further comprising:

detecting a trend corresponding to a portion of a railroad track of the network of railroad tracks;

receiving a route from a third computing device attached to a third train, wherein the route includes the portion of the railroad track; and providing, based on the trend, operation instructions to the third train for use during travel on at least the portion of the railroad track.

\* \* \* \* \*